United States Patent
Clark et al.

(10) Patent No.: US 12,469,204 B2
(45) Date of Patent: Nov. 11, 2025

(54) BUILDING AN ACCELERATION STRUCTURE FOR USE IN RAY TRACING

(71) Applicant: Imagination Technologies Limited, Kings Langley (GB)

(72) Inventors: Gregory Clark, Hertfordshire (GB); Bruno Char, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 271 days.

(21) Appl. No.: 18/096,133

(22) Filed: Jan. 12, 2023

(65) Prior Publication Data
US 2023/0260194 A1    Aug. 17, 2023

(30) Foreign Application Priority Data

Jan. 12, 2022    (GB) .................................... 2200347

(51) Int. Cl.
*G06T 15/06*    (2011.01)
*G06T 17/10*    (2006.01)

(52) U.S. Cl.
CPC .............. *G06T 15/06* (2013.01); *G06T 17/10* (2013.01); *G06T 2210/36* (2013.01)

(58) Field of Classification Search
CPC ......... G06T 15/06; G06T 15/08; G06T 15/10; G06T 15/80; G06T 15/205; G06T 17/005; G06T 17/05; G06T 17/10; G06T 2210/36; G06T 2210/12; G06T 1/60; G06T 1/20; G06T 15/005; G06F 9/5011
See application file for complete search history.

(56) References Cited

U.S. PATENT DOCUMENTS

| | | | |
|---|---|---|---|
| 8,717,357 B2 * | 5/2014 | McCombe | G06T 17/00 345/619 |
| 9,430,864 B2 | 8/2016 | McCombe et al. | |
| 10,217,267 B2 | 2/2019 | McCombe et al. | |
| 10,930,052 B2 | 2/2021 | McCombe et al. | |
| 11,302,056 B2 * | 4/2022 | Muthler | G06T 15/005 |
| 11,481,954 B2 | 10/2022 | McCombe et al. | |
| 11,574,434 B2 * | 2/2023 | Ozdas | G06T 15/08 |

(Continued)

FOREIGN PATENT DOCUMENTS

| | | |
|---|---|---|
| CN | 112712581 A | 4/2021 |
| WO | 2013/022804 A1 | 2/2013 |

OTHER PUBLICATIONS

Pineda; "Exploring Material Representations for Sparse Voxel Dags"; Jun. 30, 2021; URL:https://digitalcommons.calpoly.edu/cgi/viewcontent.cgi?article=3860&context=theses; 91 pages.

*Primary Examiner* — Vijay Shankar
(74) *Attorney, Agent, or Firm* — Potomac Law Group, PLLC; Vincent M DeLuca

(57) ABSTRACT

A computer implemented method of building an acceleration structure for use in ray tracing includes (i) assigning, in a memory, a different one or more blocks of memory to each of a plurality of threads, each of the blocks of memory comprising one or more memory locations; (ii) for each element of a plurality of elements of a scene for which nodes of the acceleration structure are to be built, assigning that element of the scene to a block of memory so as to assign that element to a thread; and (iii) building one or more nodes of the acceleration structure by processing each of the plurality of threads in parallel.

20 Claims, 11 Drawing Sheets

(56) References Cited

U.S. PATENT DOCUMENTS

| | | | |
|---|---|---|---|
| 11,861,786 B2* | 1/2024 | Ozdas | G06T 15/08 |
| 2013/0016109 A1 | 1/2013 | Garanzha | |
| 2013/0033507 A1* | 2/2013 | Garanzha | G06T 17/005 |
| | | | 345/522 |
| 2013/0113800 A1 | 5/2013 | McCombe et al. | |
| 2016/0371876 A1* | 12/2016 | McCombe | G06T 17/00 |
| 2021/0366177 A1 | 11/2021 | Viitanen et al. | |
| 2021/0398340 A1 | 12/2021 | Muthler et al. | |
| 2023/0019499 A1* | 1/2023 | Wada | G06V 10/761 |
| 2023/0252718 A1* | 8/2023 | Fenney | G06T 15/06 |
| 2023/0316642 A1* | 10/2023 | Mory | G01S 7/52071 |
| | | | 345/418 |
| 2024/0177392 A1* | 5/2024 | Murali | G06T 19/00 |

* cited by examiner

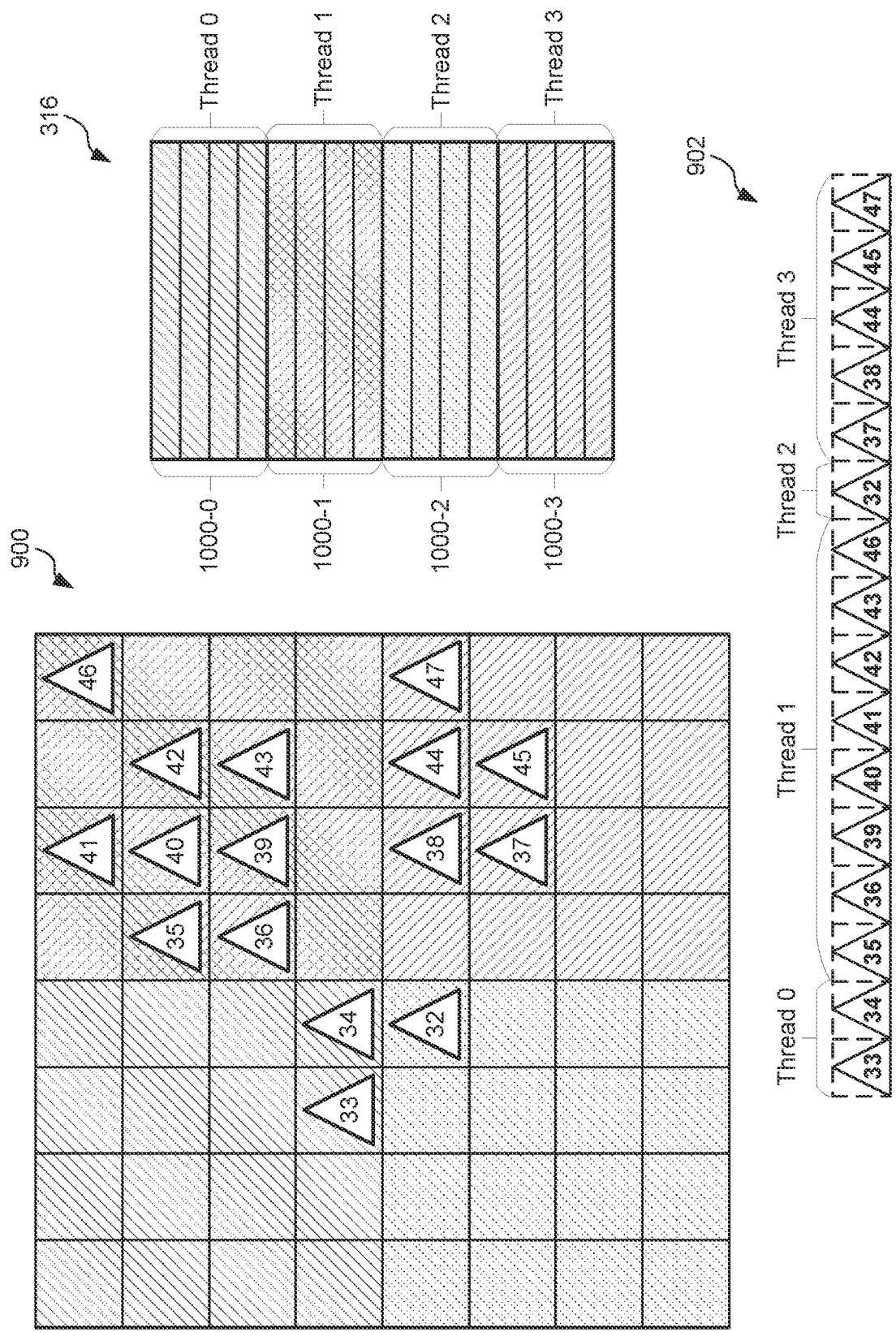

BUILDING AN ACCELERATION STRUCTURE FOR USE IN RAY TRACING

FIELD

The present disclosure is directed to building an acceleration structure for use in ray tracing.

BACKGROUND

Ray tracing is a computational rendering technique for rendering an image of a scene by tracing paths of light ('rays') through the scene, e.g. from a viewpoint from which the image of the scene is being rendered. A ray can be modelled as originating from the viewpoint and passing through a pixel of a rendering space into the scene. A ray that originates from the viewpoint is referred to as a "primary ray". As a ray traverses the scene it may intersect one or more objects within the scene. The interaction between a ray and an object it intersects can be modelled to create realistic visual effects. For example, in response to determining an intersection of a ray with an object, a shader program (i.e. a portion of computer code) may be executed in respect of the intersection. A programmer can write the shader program to define how the system reacts to the intersection which may, for example cause one or more further rays (referred to as "secondary rays) to be emitted into the scene, e.g. to represent a reflection of the ray off the intersected object or a refraction of the ray through the object (e.g. if the object is transparent or translucent). As another example, the shader program could cause one or more rays to be emitted into the scene for the purposes of determining whether the object is in shadow at the intersection point. The result of executing the shader program (and processing any relevant secondary rays) can be the calculation of a rendered value (e.g. a colour value) for the pixel the ray passed through. In this way, rendered values representing the image of the scene can be determined.

In order to reduce the number of intersection tests that need to be performed, ray tracing systems can use acceleration structures, wherein each node of an acceleration structure represents a region within the scene. Acceleration structures are often hierarchical (e.g. having a tree structure) such that they include multiple levels of nodes, wherein nodes near the top of the acceleration structure (i.e. nodes near the root) represent relatively large regions in the scene (e.g. the root node may represent the whole scene), and nodes near the bottom of the acceleration structure (i.e. nodes near the leaves) represent relatively small regions in the scene. A hierarchical acceleration structure may be referred to as a "hierarchy". Leaf nodes of the acceleration structure represent regions bounding one or more objects in the scene. The acceleration structure can have different structures in different examples, e.g. a grid structure, an octree structure, a space partitioning structure (e.g. a k-d tree) or a bounding volume hierarchy to give some examples. The nodes can represent suitable shapes or regions in the scene (which may be referred to herein as "boxes"). For example, the nodes may represent axis-aligned bounding boxes (AABBs) in the scene.

Intersection testing can be performed for a ray in a recursive manner using the acceleration structure. First, the ray is tested for intersection with the root node of the acceleration structure. If the ray is found to intersect a region represented by a parent node (e.g. the root node), testing then proceeds to the child nodes of that parent node. In contrast, if the ray is found not to intersect a parent node, intersection testing of the child nodes of that parent node can be avoided, thereby saving computational effort. If a ray is found to intersect with a leaf node then it can be tested against the (parts of) objects within the region represented by the leaf node to thereby determine which object(s) the ray intersects with. If more than one intersection is found for a ray then the closest of the intersection points to the ray's origin (i.e. the first intersection that the ray encounters in the scene) can be identified and the ray is determined to intersect the object at the identified closest intersection. The use of an acceleration structure (rather than testing rays directly with all of the objects in the scene) reduces the number of intersection tests that need to be performed, and simplifies the intersection tests. The intersection tests are simpler because the nodes of the acceleration structure represent basic shapes (e.g. axis-aligned bounding boxes or spheres) for which intersection tests are simpler than for more complex object shapes, e.g. defined in terms of triangular primitives for which the orientation is not predetermined.

FIG. 1 shows a ray tracing system 100 comprising a ray tracing unit 102 and a memory 104. The ray tracing unit 102 comprises a processing module 106, an intersection testing module 108 and processing logic 110. In operation the ray tracing unit 102 receives geometric data defining objects within the 3D scene. The ray tracing unit 102 also receives an indication of a viewpoint from which an image of the scene is to be rendered. The processing module 106 is configured to generate (e.g. "build") an acceleration structure based on the geometric data, and to send the acceleration structure to the memory 104 for storage therein. After the acceleration structure has been stored in the memory 104, the intersection testing module 108 can retrieve nodes of the acceleration structure from the memory 104 to perform intersection testing of rays against the retrieved nodes. The results of the intersection tests indicate which object in the scene a ray intersects, and the results may also indicate a position on the object at which the ray intersects the object, and may also indicate a distance along the ray that the intersection occurs. The results of the intersection testing are provided to the processing logic 110. The processing logic 110 is configured to process the results of the intersection testing to determine rendered values representing the image of the 3D scene. Secondary rays emitted into the scene during processing the results of the intersection testing at the processing logic 110 can be returned to the intersection testing module 108 for further intersection testing, the results of which are provided to the processing logic 110, and so on. The rendered values determined by the processing logic 110 can be passed back to the memory 104 for storage therein to represent the image of the 3D scene.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to a first aspect of the present invention there is provided a computer implemented method of building an acceleration structure for use in ray tracing, the method comprising; (i) assigning, in a memory, a different one or more blocks of memory to each of a plurality of threads, each of the blocks of memory comprising one or more memory locations; (ii) for each element of a plurality of elements of a scene for which nodes of the acceleration structure are to be built, assigning that element of the scene to a block of memory so as to assign that element to a thread; and (iii) building one or more nodes of the acceleration structure by processing each of the plurality of threads in parallel.

Elements of the scene may be distributed across a number of levels-of-detail, each level-of-detail dividing the scene into one or more voxels. Finer levels-of-detail may represent the scene using a greater number of smaller voxels and coarser levels-of-detail may represent the scene using a smaller number of larger voxels.

The scene may be a three-dimensional scene, and a voxel may be a volume containing a portion of the scene.

Each voxel may have a voxel address, each voxel address comprising a set of coordinates and data identifying the level-of-detail at which that voxel is present.

The set of coordinates may be defined relative to a scene origin.

The method may further comprise, for each of a plurality of levels-of-detail in turn, starting at a finer level-of-detail, performing steps (i), (ii) and (iii).

A hash function may be used to assign that element of the scene to the block of memory.

That element of the scene may be associated with a voxel address at a current level-of-detail, and the hash function used to assign that element to the block of memory may be dependent on a corresponding voxel address at a coarser level-of-detail.

Building one or more nodes of the acceleration structure may comprise, for each thread of the plurality of threads: for each element of the elements of the scene assigned to that thread, assigning that element to a memory location in a block of memory; and evicting data representing the assigned element(s) from each memory location to which one or more elements of the scene have been assigned so as to form nodes of the acceleration structure grouping elements assigned to same memory location.

A bounding box may be defined for each node of the acceleration structure encompassing each of the elements of the scene assigned to same memory location.

That element of the scene may be assigned to the memory location in the block of memory in dependence on a hash function.

That element of the scene may be associated with a voxel address at a current level-of-detail, and the hash function in dependence on which that element is assigned to the memory location in the block of memory may be dependent on a corresponding voxel address at a coarser level-of-detail.

The corresponding voxel address at the coarser level-of-detail may be determined by: dividing, by two, each coordinate of the voxel address associated with that element at the current level-of-detail; and rounding each divided coordinate value down to the nearest integer coordinate value.

An element of the scene may be a primitive, a portion of a sub-divided primitive or a node of the acceleration structure built for a finer level-of-detail.

The memory may be a cache or a software-representation of a cache.

The memory may be a set-associative cache, each of the blocks of memory may be a group of one or more sets of cachelines, and each of the memory locations may be a cacheline; or the memory may be a direct-mapped cache, each of the blocks of memory may be a group of one or more cachelines, and each of the memory locations may be a cacheline.

The memory may be a software-representation of a set-associative cache, each of the blocks of memory may be a software-representation of a group of one or more sets of cachelines, and each of the memory locations may be a software-representation of a cacheline; or the memory may be a software-representation of a direct-mapped cache, each of the blocks of memory may be a software-representation of a group of one or more cachelines, and each of the memory locations may be a software-representation of a cacheline.

The scene may comprise a plurality of primitives, and the method may further comprise, prior to steps (i), (ii), and (iii), sorting the primitives into multiple groups of primitives, such that each primitive of the scene is allocated to only one group and all of the primitives are allocated to a group; and, for each group of primitives, independently performing steps (i), (ii) and (iii).

The primitives may be sorted into multiple groups of primitives in dependence on the position of each of the primitives within in the scene.

A bounding box may be defined for each group of primitives, each bounding box encompassing the primitives sorted to that group.

According to a second aspect of the present invention there is provided a ray tracing system for building an acceleration structure for use in ray tracing, the ray tracing system comprising thread assigning logic, node building logic, and a memory: the thread assigning logic being configured to: assign, in the memory, a different one or more blocks of memory to each of a plurality of threads, each of the blocks of memory comprising one or more memory locations; and for each element of a plurality of elements of a scene for which nodes of the acceleration structure are to be built, assign that element of the scene to a block of memory so as to assign that element to a thread; and the node building logic being configured to: build one or more nodes of the acceleration structure by processing each of the plurality of threads in parallel.

The ray tracing system may be embodied in hardware on an integrated circuit. There may be provided a method of manufacturing, at an integrated circuit manufacturing system, a ray tracing system. There may be provided an integrated circuit definition dataset that, when processed in an integrated circuit manufacturing system, configures the system to manufacture a ray tracing system. There may be provided a non-transitory computer readable storage medium having stored thereon a computer readable description of a ray tracing system that, when processed in an integrated circuit manufacturing system, causes the integrated circuit manufacturing system to manufacture an integrated circuit embodying a ray tracing system.

There may be provided an integrated circuit manufacturing system comprising: a non-transitory computer readable storage medium having stored thereon a computer readable description of the ray tracing system; a layout processing system configured to process the computer readable description so as to generate a circuit layout description of an integrated circuit embodying the ray tracing system; and an integrated circuit generation system configured to manufacture the ray tracing system according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 2b illustrates a hierarchical acceleration structure used to represent the regions shown in FIG. 2a;

FIGS. 9a and 9b show two-dimensional (i.e. 2D) examples of assigning primitives of the scene at one level-of-detail to threads for subsequent processing;

Figure 1:
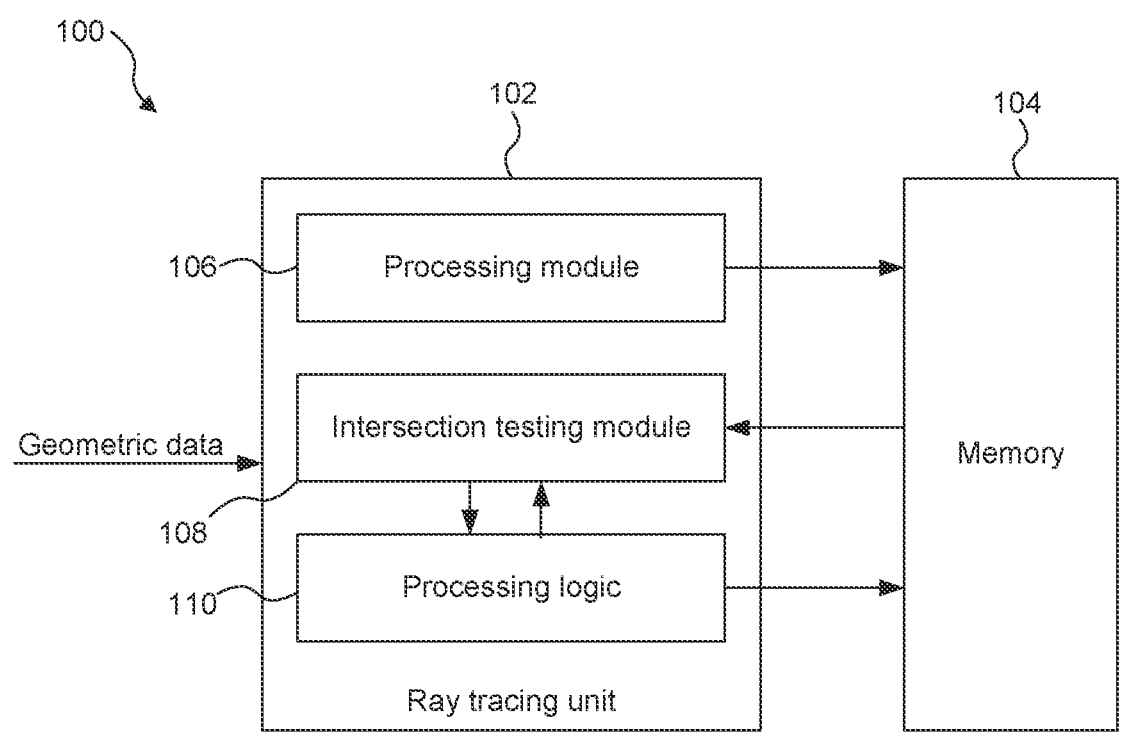
FIG. 1 shows a prior art ray tracing system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments will now be described by way of example only.

Figure 2A:
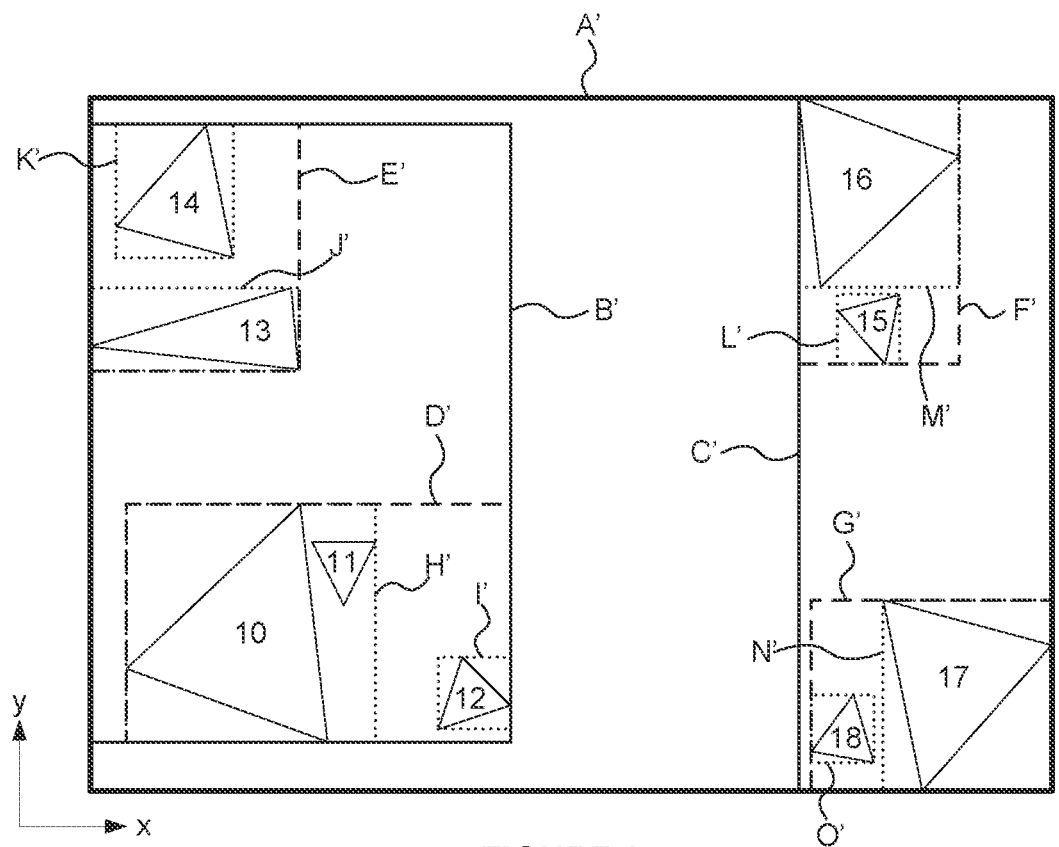
FIG. 2a shows a two-dimensional (i.e. 2D) example of regions and primitives within a scene against which rays are to be tested for intersection.
Figure 2B:
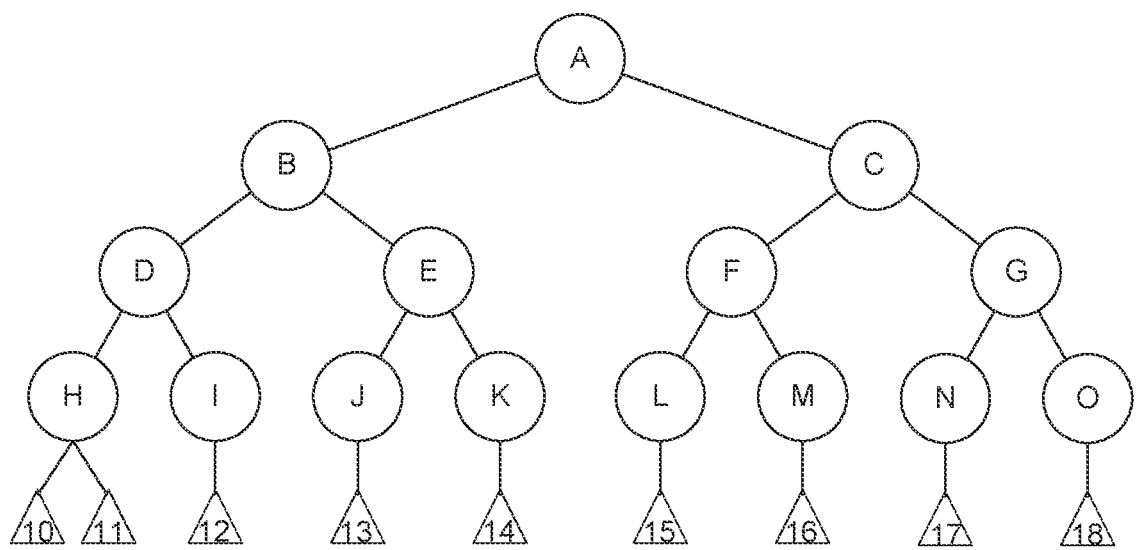

By way of example, FIG. 2a shows a 2D (i.e. two-dimensional) example of regions and primitives within a scene against which rays are to be tested for intersection. In other examples, the scene and the regions are three-dimensional, but for ease of illustration and understanding FIG. 2a shows a two-dimensional scene with two-dimensional regions within the scene. FIG. 2b illustrates a hierarchical acceleration structure used to represent the regions shown in FIG. 2a. FIG. 2a shows the directions of the x and y axes. All of the regions shown in FIG. 2a are axis-aligned bounding boxes (AABBs). FIG. 2a also illustrates nine triangular primitives (labelled 10 to 18 in FIG. 2a) within the scene. Primitives are used to represent objects in the scene to be rendered, and can be any shape, but often primitives are planar polygons (e.g. triangles), lines or points, which can be defined in terms of their vertices.

The root node (A) of the hierarchical acceleration structure represents the region A' which is an AABB covering the whole scene. Node A has two children in the hierarchical acceleration structure: nodes B and C. Node B represents the region B' which is an AABB shown towards the left hand side of the scene shown in FIG. 2a. Node C represents the region C' which is an AABB shown towards the right hand side of the scene shown in FIG. 2a. Node B has two children in the hierarchical acceleration structure: nodes D and E. Node D represents the region D' which is an AABB represented with a dashed line towards the bottom of the region B' shown in FIG. 2a. Node E represents the region E' which is an AABB represented with a dashed line towards the top left of the region B' shown in FIG. 2a. Node D has two children in the hierarchical acceleration structure: nodes H and I. Node H represents the region H' which is an AABB represented with a dotted line towards the left hand side of the region D', and which contains the primitives 10 and 11 as shown in FIG. 2a. Node I represents the region I' which is an AABB represented with a dotted line towards the bottom right of the region D', and which contains the primitive 12 as shown in FIG. 2a. Node E has two children in the hierarchical acceleration structure: nodes J and K. Node J represents the region J' which is an AABB represented with a dotted line at the bottom of the region E', and which contains the primitive 13 as shown in FIG. 2a. Node K represents the region K' which is an AABB represented with a dotted line towards the top of the region E', and which contains the primitive 14 as shown in FIG. 2a. Node C has two children in the hierarchical acceleration structure: nodes F and G. Node F represents the region F' which is an AABB represented with a dashed line at the top left of the region C' shown in FIG. 2a. Node G represents the region G' which is an AABB represented with a dashed line at the bottom of the region C' shown in FIG. 2a. Node F has two children in the hierarchical acceleration structure: nodes L and M. Node L represents the region L' which is an AABB represented with a dotted line at the bottom of the region F', and which contains the primitive 15 as shown in FIG. 2a. Node M represents the region M' which is an AABB represented with a dotted line at the top of the region F', and which contains the primitive 16 as shown in FIG. 2a. Node G has two children in the hierarchical acceleration structure: nodes N and O. Node N represents the region N' which is an AABB represented with a dotted line on the right of the region G', and which contains the primitive 17 as shown in FIG. 2a. Node O represents the region O' which is an AABB represented with a dotted line towards the bottom left of the region G', and which contains the primitive 18 as shown in FIG. 2a.

FIG. 2b illustrates how the primitives relate to the nodes of the hierarchical acceleration structure. The primitives (or copies thereof) shown in FIG. 2b may be comprised by the hierarchical acceleration structure. Alternatively, the hierarchical acceleration structure may comprise references (e.g. pointers) to the primitives stored elsewhere in memory, such that the primitives themselves are not actually part of the hierarchical acceleration structure. A "node" of the hierarchical acceleration structure represents a region (e.g. an AABB). A "tree node" refers to a node which has pointers to other nodes in the hierarchical acceleration structure (i.e. a tree node has child nodes in the hierarchical acceleration structure). A "leaf node" refers to a node which has one or more pointers to one or more primitives (i.e. a leaf node does not have child nodes in the hierarchical acceleration structure). With reference to FIG. 2b, nodes A, B, C, D, E, F and G are tree nodes of the hierarchical acceleration structure; nodes H, I, J, K, L M, N and O are leaf nodes of the hierarchical acceleration structure; and triangles 10 to 18 are not nodes of the hierarchical acceleration structure, but are illustrated in FIG. 2b to indicate which leaf nodes have pointers to which primitives. For completeness, it is noted that FIG. 2b is a binary tree, in which all the leaf nodes occur at the same depth/number of nodes from the root node, but that need not be the case. The nodes of the acceleration structure may not be arranged in a binary tree, and the leaf nodes may occur at different depths within the tree.

Figure 3:
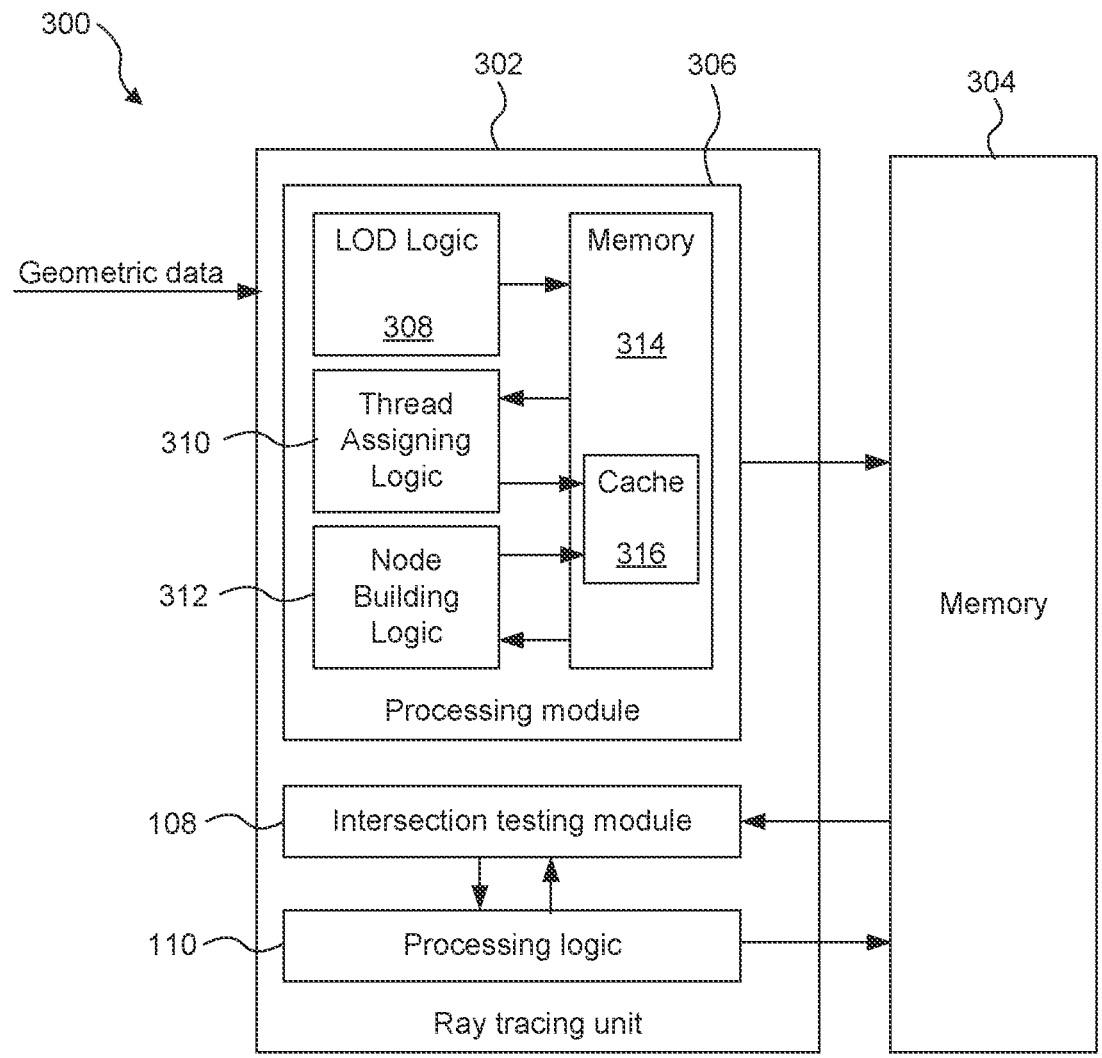
FIG. 3 shows a ray tracing system according to the principles described herein.

FIG. 3 shows a ray tracing system 300 according to the principles described herein. Ray tracing system 300 comprises a ray tracing unit 302 and a memory 304. Ray tracing system 300 may comprise hardware components (e.g. hardware processing units) and software components (e.g. firmware, and the procedures and tasks for execution at the hardware processing units). Ray tracing unit 302 may be implemented on an integrated circuit. In an example, the ray tracing unit 302 may be implemented on a chip and the memory 304 may be physically located on the same chip as the ray tracing unit 302. In this example, memory 304 may be referred to as "on-chip memory". In another example, the ray tracing unit 302 may be implemented on a chip and the memory 304 may not be physically located on the same chip as the ray tracing unit. In this example, memory 304 may be referred to as "external memory" or "off-chip memory".

The ray tracing unit 302 comprises a processing module 306, an intersection testing module 108 and processing logic 110. In operation, the ray tracing unit 302 receives geometric data defining objects within the 3D scene. The scene may comprise a plurality of primitives. Primitives are used to represent objects in the scene to be rendered, and can be any shape, but often primitives are planar polygons (e.g. triangles), lines or points, which can be defined in terms of their vertices. The ray tracing unit 302 also receives an indication of a viewpoint from which an image of the scene is to be rendered. The processing module 306 is configured to build (e.g. generate) an acceleration structure based on the geometric data, as will be described in further detail herein. The processing module 306 may send the acceleration structure to the memory 304 for storage therein. The intersection testing module 108 can retrieve nodes of the acceleration structure from the memory 304 to perform intersection testing of rays against the retrieved nodes. The results of the intersection tests indicate which object in the scene a ray intersects, and the results may also indicate a position on the object at which the ray intersects the object, and may also indicate a distance along the ray that the intersection occurs. The results of the intersection testing are provided to the processing logic 110. The processing logic 110 is configured to process the results of the intersection testing to determine rendered values representing the image of the 3D scene. Secondary rays emitted into the scene during processing the results of the intersection testing at the processing logic 110 can be returned to the intersection testing module 108 for further intersection testing, the results of which are provided to the processing logic 110, and so on. The rendered values determined by the processing logic 110 can be passed back to the memory 304 for storage therein to represent the image of the 3D scene.

The processing module 306 comprises level-of-detail (LOD) logic 308, thread assigning logic 310 and node building logic 312. Each of level-of-detail (LOD) logic 308, thread assigning logic 310, node building logic 312 may be implemented in hardware, software, or any combination thereof. For example, it may be seen to be undesirable to dedicate chip area to highly-specialised (e.g. fixed-function) hardware for building acceleration structures. Hence, level-of-detail (LOD) logic 308, thread assigning logic 310, node building logic 312 may be implemented in software run on a general purpose processor. In particular, level-of-detail (LOD) logic 308, thread assigning logic 310, node building logic 312 may be implemented in software run on a general purpose parallel processor. For example, a general purpose parallel processor can be implemented using one or more graphics processing units (GPUs).

Computational work to be performed by a parallel processor can be arranged into so called "workgroups" and "threads". A workgroup may comprise a plurality of threads, where that plurality of threads can be processed in parallel (e.g. at a single core of a graphics processing unit). Workgroups may be processed independently of each other (e.g. at different graphics processing unit cores, or in series at a single core of a graphics processing unit). That is, threads within the same workgroup may be able to synchronise with each other during processing, and may also be able to share access during their processing to memory dedicated to the GPU core processing those threads (e.g. on-chip memory dedicated to the GPU core processing those threads). By contrast, different workgroups may not be able to synchronise with each other during processing, and may not be able to share access during their processing to memory dedicated to a certain GPU core. A workgroup may be arranged as an array of threads (e.g. a one-dimensional, two-dimensional or three-dimensional array of threads). The number of threads comprised by a workgroup may be limited. The limit on the number of threads comprised by a workgroup may be caused by a hardware restriction (e.g. a limit on how many threads can be processed in parallel on the available processing hardware). In a common example, a workgroup may comprise up to 1024 threads. In this example, if more than 1024 threads are to be processed in accordance with the same computational program (e.g. shader program), then more than one workgroup will be associated with that computational program. For example, if 3000 threads are to be processed in accordance with the same computational program, then three workgroups may be associated with that computational program (e.g. two of which could be fully packed, the third being partially packed). It is to be understood that the "workgroup" and "thread" terminology used herein is not intended to be limiting, and that other terminology could be used to describe the same concepts. For example, a "thread" as described herein could alternatively be referred to as an "invocation" or a "work-item", whilst a "workgroup" as described herein could alternatively be referred to as a "thread block" or a "threadgroup".

The processing module 306 also comprises memory 314, which may be referred to as "local memory". That is, the processing module 306 may be implemented on a chip and the memory 314 may be physically located on the same chip as the processing module 306. In examples where memory 304 is physically located on the same chip as the ray tracing unit 302, memory 314 may be part of memory 304 (not shown in FIG. 3). Memory 314 shown in FIG. 3 comprises cache 316—which may be a hardware cache or a software-representation of a cache. For example, memory 314 may comprise random-access memory (RAM) and a portion of that RAM memory may be used to simulate temporary storage so as to implement a software-representation of a cache 316.

Figure 8:
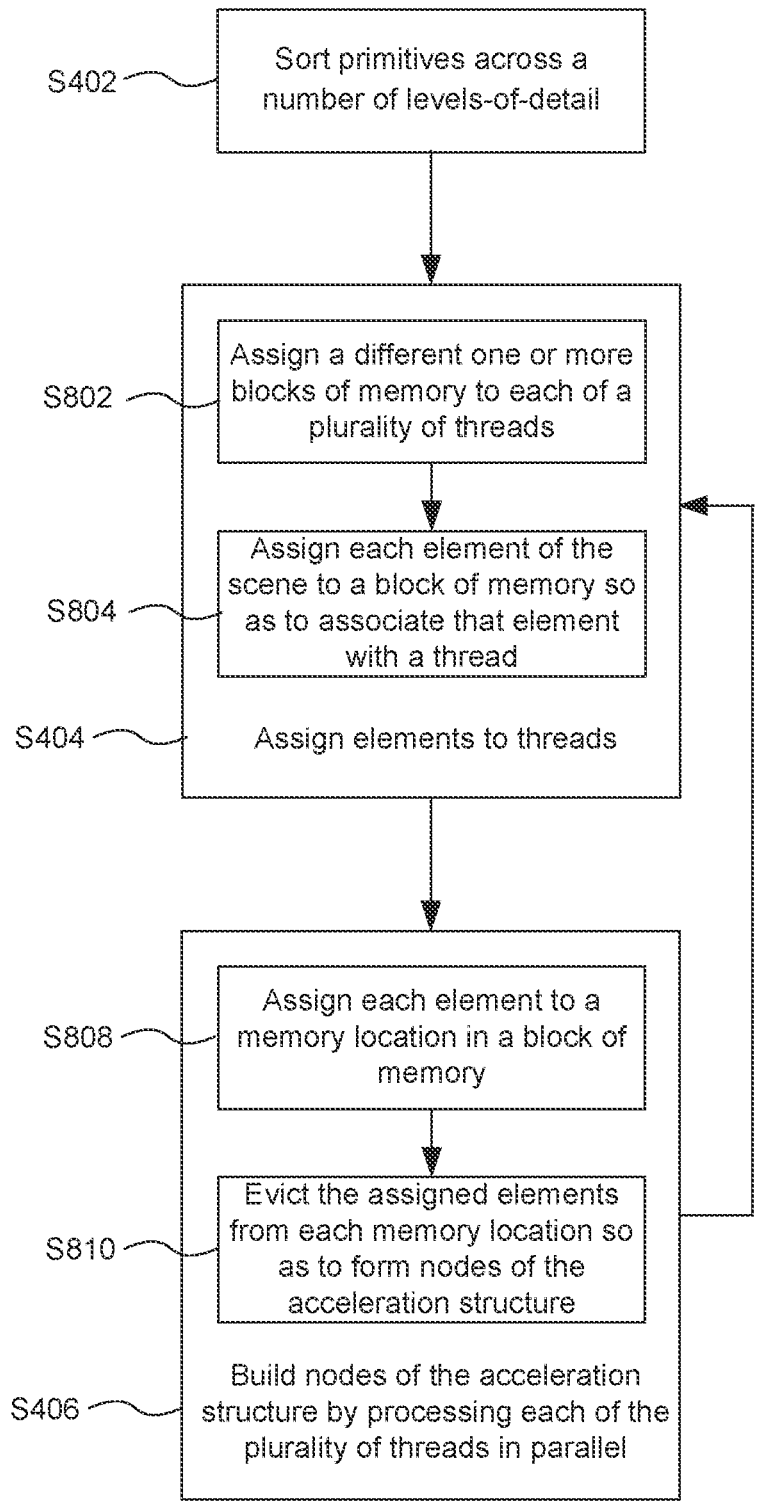
FIG. 8 is a flow chart for a method of building an acceleration structure for use in ray tracing in accordance with the principles described herein.

FIG. 8 is a flow chart for a method of building an acceleration structure for use in ray tracing in accordance with the principles described herein. The method steps of FIG. 8 may be performed by processing module 306. First, in step S402, the primitives of the scene are sorted across a number of levels-of-detail (LOD) at which the scene is to be represented, as will be described in further detail herein. Step S402 may be performed by level-of-detail (LOD) logic 308. Steps S404 and S406 may then be performed in turn at each level-of-detail. In step S404, for the finest level-of-detail, primitives of the scene are assigned to threads for processing, as will be described in further detail herein. Step S404 may be performed by thread assigning logic 310. Step S404 may be performed in parallel for a plurality of primitives of the scene. In step S406, for the finest level-of-detail, each of the threads to which primitives were assigned in step S404 are processed in parallel, so as to build (e.g. form) one or more nodes of the acceleration structure, as will be described in further detail herein. Step S406 may be performed by node building logic 312. The method then returns to step S404 where, for the next coarsest level-of-detail, primitives of the scene and nodes built for the finest level-of-detail (e.g. collectively referred to as "elements of the scene") are assigned to threads for processing. Step S404 may be performed in parallel for a plurality of elements of the scene. Then, returning again to step S406, each of the threads to which elements of the scene were assigned in step S404 are processed in parallel, so as to build (e.g. form) one or more further nodes of the acceleration structure. Steps S404 and S406 may be performed in this way for each level-of-detail defined in step S402.

As described herein, in step S402 of FIG. 8, the primitives of the scene are sorted across a number of levels-of-detail (LOD) at which the scene is to be represented. Step S402 can be understood in further detail with reference to FIGS. 4, 5 and 6.

Figure 4:
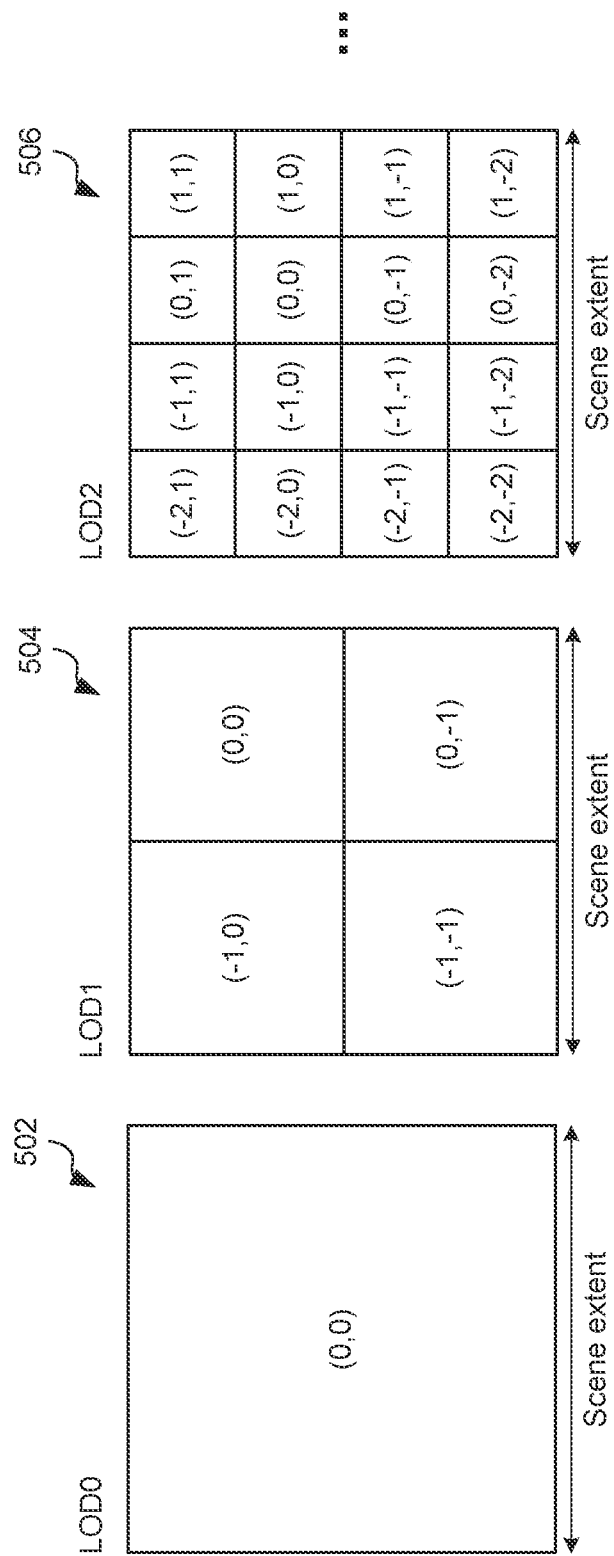
FIG. 4 shows a two-dimensional (i.e. 2D) example of a scene divided into one or more voxels at a number of levels-of-detail.

FIG. 4 shows a two-dimensional (i.e. 2D) example of a scene divided into one or more voxels at a number of levels-of-detail (e.g. LOD0, LOD1 and LOD2). Typically a scene would be three-dimensional (i.e. 3D), but for ease of illustration and understanding FIG. 4 shows levels-of-detail for a two-dimensional scene. The scene may be contained within a square in 2D, or a cube in 3D, having extents of length the power-of-two larger than the maximum vertex, on any dimension, of the primitives comprised by the scene. The scene extent may be determined from the input geometric data (e.g. by LOD logic 308). It is to be understood that the scene need not be contained within a square in 2D or a cube in 3D, and that other shapes such as rectangles in 2D or cuboids in 3D, or any other suitable shape in 2D or 3D, could be used to contain the scene. The scene can be represented at a number of levels-of-detail (LOD). Each level-of-detail divides the scene into one or more voxels. For a two-dimensional scene, a voxel is an area containing a two-dimensional portion of the scene. For a three-dimensional scene, a voxel is a volume containing a three-dimensional portion of the scene. Finer levels-of-detail represent the scene using a greater number of smaller voxels, and coarser levels-of-detail represent the scene using a smaller number of larger voxels. For example, as shown in FIG. 4, at the coarsest level-of-detail (LOD0) 502, the scene is represented using a single voxel, that voxel containing the entire scene. At the next finest level-of-detail (LOD1) 504 the scene is divided into four voxels having equal areas (or, in three-dimensions, eight voxels having equal volumes). At the next finest level-of-detail (LOD2) 506 the scene is divided into 16 voxels having equal areas (or, in three-dimensions, 64 voxels having equal volumes). FIG. 4 shows a scene represented at three levels-of-detail. It is to be understood that a scene can be represented at any number of levels-of-detail. For example, a scene can be represented at 32 levels-of-detail (e.g. LOD0 to LOD31). In two-dimensions, at each subsequent finer level-of-detail the area contained a voxel may be a quarter of the area contained by a voxel at the next coarsest level-of-detail. In three-dimensions, at each subsequent finer level-of-detail the volume contained a voxel may be one-eighth of the volume contained by a voxel at the next coarsest level-of-detail. Put another way, in two-dimensions, the number of voxels used to represent the scene at the $N^{th}$ level-of-detail (LOD(N)) may be $4^N$. In three-dimensions, the number of voxels used to represent the scene at the Nth level-of-detail (LOD(N)) may be $8^N$. It is to be understood that the shape, relative number and relative sizes of voxels used to represent the scene at different levels-of-detail as described with reference to FIG. 4 are provided herein by way of example only. In some examples: the voxels used to represent a scene at different levels-of-detail could be rectangular in 2D or cuboidal in 3D (particularly in examples where the scene is contained within a rectangle in 2D or a cuboid in 3D), or any other suitable shape in 2D or 3D; the number of voxels used to represent the scene at the $N^{th}$ level-of-detail (LOD(N)) may be $9^N$ in 2D or $27^N$ in 3D, or any other suitable number in 2D or 3D; and/or each of the voxels used to represent a scene at a certain level-of-detail need not be of equal area in 2D or equal volume in 3D.

As shown in FIG. 4, each voxel may have a voxel address. A voxel address may comprise a set of coordinates (e.g. (x, y) coordinates in 2D, or (x, y, z) coordinates in 3D) and data identifying the level-of-detail at which that voxel is present. For example, the set of coordinates for the single voxel in LOD0 is (0,0) and the voxel address for that voxel may further comprise data indicating that that voxel is present at LOD0. The set of coordinates may be defined relative to a scene origin. That is, the voxel at each level-of-detail containing the scene origin may be assigned the coordinates (0,0) in 2D, or the coordinates (0,0,0) in 3D, and the positions of each of the other voxels may be defined relative to that voxel. By way of example, the set of coordinates for each of the voxels in LOD0, LOD1 and LOD2 is shown in FIG. 4.

Each voxel address may have a corresponding (e.g. "parent") voxel address at the next coarsest level-of-detail. The corresponding (e.g. "parent") voxel address for a voxel at a level-of-detail (e.g. LOD(N)) is the voxel address of the voxel at the next coarsest level-of-detail (e.g. LOD(N−1)) that contains the portion of the scene contained by voxel. For example, in FIG. 4, the corresponding voxel address for the voxel having coordinate (−2,1) in LOD2 is the voxel address for the voxel having coordinate (−1,0) in LOD1. This is because the voxel having coordinate (−1,0) in LOD1 contains the "top-left" quarter of the scene, which includes the "top-left" eighth of the scene contained by the voxel having coordinate (−2,1) in LOD2. Put another way, in two-dimensions, a voxel address in LOD(N) is the corresponding voxel address for four voxel addresses in LOD(N+1). In three-dimensions, a voxel address in LOD(N) is the corresponding voxel address for eight voxel addresses in LOD(N+1).

In the example shown in FIG. 4, the corresponding (e.g. "parent") voxel address, at the next coarsest level-of-detail, for a voxel at a current level-of-detail can be determined by dividing, by two, each coordinate of the voxel address at the current level-of-detail and rounding each divided coordinate value down to the nearest integer coordinate value. For example, for the voxel having coordinate (−2,1) in LOD2, dividing each coordinate of that voxel address gives (−1, 0.5), and rounding each divided coordinate value down to the nearest integer coordinate value gives (−1, 0). As described herein, the corresponding voxel address for the voxel having coordinate (−2,1) in LOD2 is the voxel address for the voxel having coordinate (−1,0) in LOD1.

As described herein, the scene comprises a plurality of primitives. The primitives comprised by the scene may be of various different sizes. In step S402 of FIG. 8, primitives of the scene are sorted (e.g. distributed) across a number of levels-of-detail (LOD) at which the scene is to be represented. Broadly speaking, a primitive of the scene can be sorted to a level-of-detail at which it is approximately the same size as, or slightly smaller than, a voxel at that level-of-detail. Each primitive is subsequently processed in steps S404 and S406 of FIG. 8 at the level-of-detail to which it has been sorted.

Figure 5:
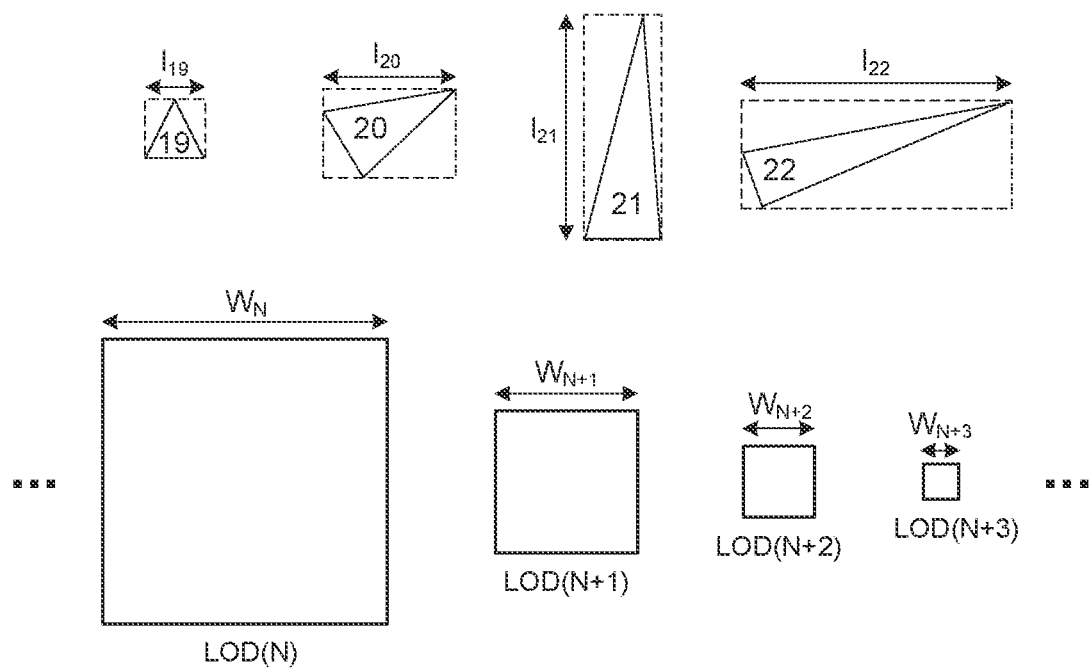
FIG. 5 shows a two-dimensional (i.e. 2D) example of an exemplary method for determining to which level-of-detail a primitive is to be sorted.

FIG. 5 shows a two-dimensional (i.e. 2D) example of an exemplary method for determining to which level-of-detail a primitive is to be sorted. FIG. 5 shows four example primitives—primitives 19, 20, 21 and 22—and representative voxels from four different levels-of-detail—LOD(N), LOD(N+1), LOD(N+2) and LOD(N+3). Each of the voxels in FIG. 5 is a square-shaped area. A heuristic may be used to quantify the size of a primitive relative to that of the voxels at each level-of-detail. For example, in FIG. 5, the maximum axis-aligned length, l, of an axis-aligned bounding box surrounding a primitive is determined. That length, l, is compared to the width, W, of the voxels at each level-of-detail. That primitive can be sorted to the finest level-of-detail at which the voxel width, W, is greater than or equal to the length, l. For example, primitive 19 could be sorted to level-of-detail LOD(N+2). This is because $W_{N+3} < l_{19} \leq W_{N+2}$. Primitive 20 could be sorted to level-of-detail LOD(N+1). This is because $W_{N+2} < l_{20} \leq W_{N+1}$. Primitive 21 could be sorted to level-of-detail LOD(N). This is because $W_{N+1} < l_{21} \leq W_N$. Primitive 22 could also be sorted to level-of-detail LOD(N). This is because $W_{N+1} < l_{22} \leq W_N$.

The method described with reference to FIG. 5 is provided by way of example only. It is to be understood that the skilled person would be aware of numerous different methods by which primitives of a scene could be sorted across a number of levels-of-detail (LOD). For example, the surface area of a primitive could be compared to the face area of the voxels at each level-of-detail, and that primitive could be sorted to the finest level-of-detail at which the face area of a voxel is greater than or equal to the surface area of that primitive. In other examples, various heuristics quantifying the size of a primitive relative to that of the voxels at each level-of-detail can be considered. In these examples, the value of each heuristic to the decision as to which level-of-detail a primitive is to be sorted can be weighted by the relative importance of that heuristic. Details of all of these numerous methods are beyond the scope of this disclosure.

Optionally, a primitive may be sub-divided into multiple portions such that each portion of that primitive can be sorted to and subsequently processed at a finer level-of-detail. This may be termed "voxelisation". It may be desirable to perform voxelisation for primitives with high aspect ratios (e.g. long, thin primitives). Voxelisation may be performed when the aspect ratio of a primitive exceeds a threshold. For example, the aspect ratio of a triangular primitive may be the ratio of its longest side to its shortest side, and the threshold may be an aspect ratio of 5:1.

Figure 6:
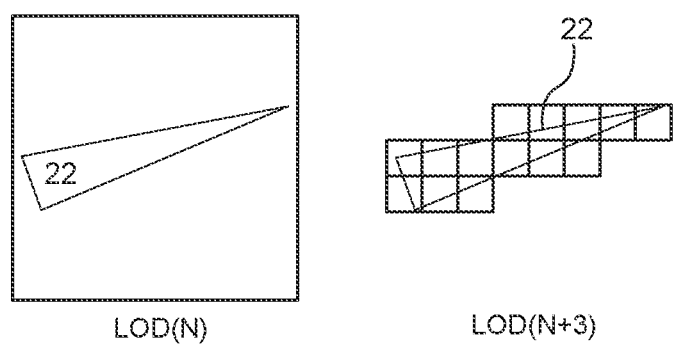
FIG. 6 illustrates, in a two-dimensional (i.e. 2D) example, the sub-division of a primitive by voxelisation.

Voxelisation can be further understood with reference to FIG. 6—which illustrates, in a two-dimensional (i.e. 2D) example, the sub-division of a primitive by voxelisation. As described herein, using the heuristic described with reference to FIG. 5, primitive 22 could be sorted to LOD(N). However, when primitive 22 is overlaid on a representative voxel from LOD(N), as shown on the left-hand-side of FIG. 6, it can be seen that large amounts of empty space exist around primitive 22. In other words, primitive 22 is not actually very similar in size to a voxel at LOD(N). Instead, as shown on the right-hand-side of FIG. 6, primitive 22 could be sub-divided into multiple portions. On the right-hand-side of FIG. 6, primitive 22 is shown overlaid on representative voxels from LOD(N+3). Primitive 22 may be sub-divided along the boundaries of each representative voxel from LOD(N+3), e.g. into 14 portions. Using the heuristic described herein with reference to FIG. 5, the 14 sub-divided portions of primitive 22 can be sorted to LOD(N+3) for subsequent processing. A bounding box (e.g. an axis-aligned bounding box—AABBs) can be formed for each sub-divided portion of a voxelised primitive. Those bounding boxes can be used as elements of the scene representative of the sub-divided portions of a voxelised primitive in the subsequent processing steps. It is to be understood that while a primitive can be sub-divided along voxel boundaries as described herein, the bounding boxes used to encompass the respective sub-divided portions can be smaller (e.g. tighter to the edges of the sub-divided portions) than the voxels in which those respective sub-divided portions are positioned. In the example shown in FIG. 6, primitive 22 is voxelised to a level-of-detail three levels finer than the level-of-detail to which it would have been sorted using the heuristic described herein with reference to FIG. 5. It is to be understood that a primitive could be voxelised to any level-of-detail finer than the level-of-detail to which it would have been sorted without voxelisation (e.g. using the heuristic described herein with reference to FIG. 5, or any other suitable heuristic).

Using the methods described with reference to FIGS. 4, 5 and 6, in step S402 of FIG. 8, each of the primitives of the scene indicated in the received input geometric data can be sorted to a respective level-of detail for subsequent processing in steps S404 and S406. The output of step S402 may be an ordered array indicating which primitives (and/or portions of primitives, where voxelisation is used) have been sorted to each level-of-detail. For example, the ordered array may first comprise information identifying each of the primitives sorted to the finest level-of-detail (e.g. LOD31), followed by information identifying each of the primitives sorted to the next coarsest level-of-detail (e.g. LOD30), followed by information identifying each of the primitives sorted to the next coarsest level-of-detail (LOD29), and so on. A prefix sum can be used to locate information within that array—as would be understood by the skilled person. Said array may be written to memory 314 by level-of-detail logic 308. Ordered arrays are preferably used to store this information because they can be used very efficiently by parallel processors in the subsequent processing steps. That said, in alternative examples, a linked list data structure could be used to store the same information.

Optionally, step S402 may also comprise sorting the primitives into multiple groups of primitives. For example, said sorting may be performed in dependence on the position of each of the primitives within in the scene. Said sorting may be performed such that that each primitive of the scene is allocated to only one group and all of the primitives are allocated to a group. It may be desirable to perform this step where the number of primitives in the scene exceeds a threshold. For example, it may be desirable to perform this step where the number of primitives to be subsequently processed at any one level-of-detail would exceed the number of primitives that can be processed in a single workgroup (e.g. exceed the number of primitives that can be processed in parallel). This step may also be performed by level-of-detail logic 308.

Figure 7:
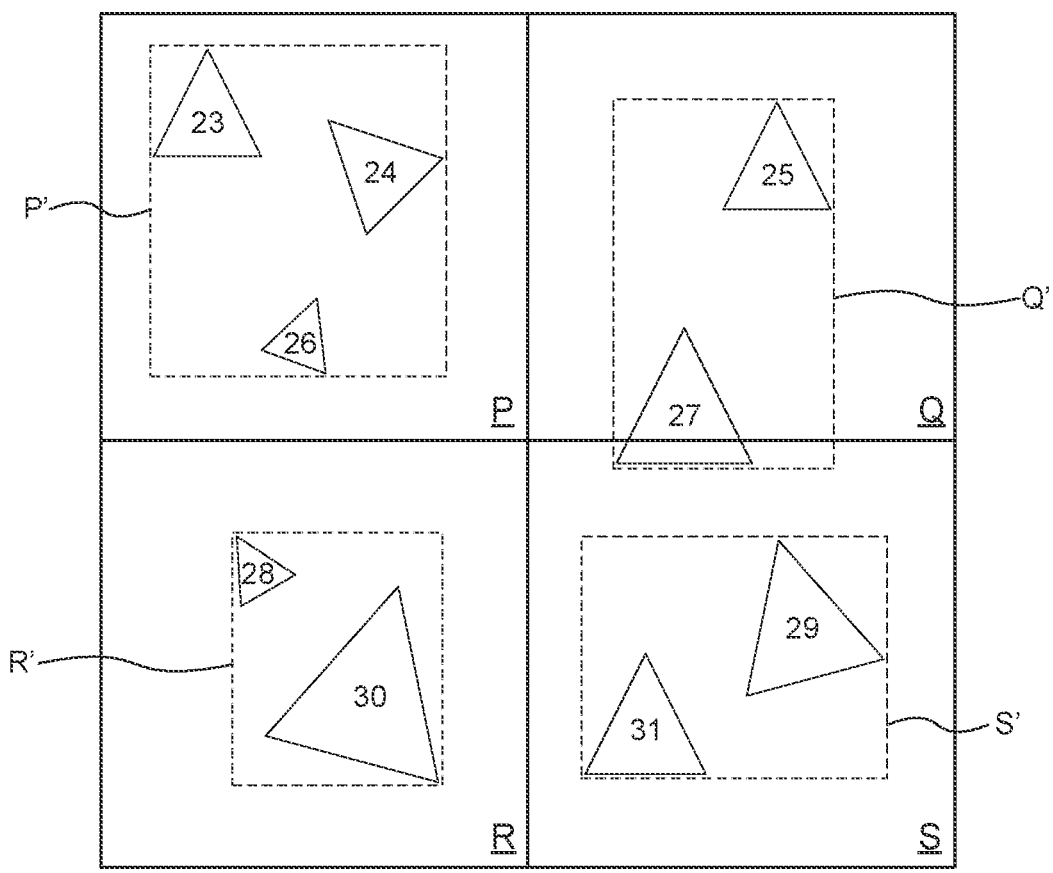
FIG. 7 shows a two-dimensional (i.e. 2D) example of grouping primitives for subsequent processing.

This optional "grouping" step can be understood in further detail with reference to FIG. 7—which shows a two-dimensional (i.e. 2D) example of grouping primitives for subsequent processing. Typically a scene would be three-dimensional (i.e. 3D), but for ease of illustration and understanding FIG. 7 show a two-dimensional scene. In FIG. 7, a scene comprising nine primitives 23, 24, 25, 26, 27, 28, 29, 30 and 31 is shown. It is to be understood that a scene may comprise any number of primitives—in fact, a typical scene may comprise tens-of-thousands, or even hundreds-of-thousands, of primitives. In FIG. 7, the scene is divided by a 2×2 grid having grid squares P, Q, R and S. It is to be understood that a scene may be divided in any other suitable manner, including by symmetrical or asymmetrical grids—e.g. by a 2×4, 4×4, 4×8, 8×8 or any other suitable grid in 2D, or a 2×2×2, 2×2×4, 4×4×4, 4×4×8, 8×8×8 or any other suitable grid in 3D. Primitives 23 to 31 are grouped in dependence on which grid square they are positioned in. The centre point of each primitive may be used to determine its position—although the position of any other point on the primitive could be used. In this way, primitives 23, 24 and 26 are grouped into a first group; primitives 25 and 27 are grouped into a second group; primitives 28 and 30 are grouped into a third group; and primitives 29 and 31 are grouped into a fourth group.

The processing of each group of primitives in steps S402, S404 and S406 of FIG. 8 can be performed independently (e.g. using separate workgroups that are not processed in parallel at the same parallel processor). That is, nodes of the acceleration structure can be built separately for each of the groups of primitives. Put another way, each group of primitives can be treated as a separate scene for the purpose of building an acceleration structure using steps S402, S404 and S406 of FIG. 8. The root node for each of those groups of primitives may be represented by a bounding box (e.g. an axis-aligned bounding box—AABB) encompassing all of the primitives sorted to that group. For example: the first group of primitives may have a root node P'; the second group of primitives may have a root node Q'; the third group of primitives may have a root node R'; and the fourth group of primitives may have a root node S'. As can be understood with reference to the second group of primitives, the bounding box Q' need not respect the boundaries of grid square Q. A root node for the entire scene may be added to the acceleration structure that points to root nodes for each of the separate groups of primitives as its child nodes.

Said grouping of primitives may be performed at the same time as (e.g. substantially simultaneously with) sorting each of the primitives of the scene across a number of levels-of-detail (LOD). For example, level-of-detail logic 308 may assess each primitive in order to determine: (1) to which group of primitives it is to be allocated in dependence on its position; and (2) within that group, to which level-of-detail it is to be sorted in dependence on its size. Alternatively, level-of-detail logic 308 may, in a first pass, determine to which group of primitives each primitive is to be allocated and, in a second and subsequent pass, determine to which level-of-detail within that group each primitive is to be sorted—or vice versa. Each group of primitives may be sorted across the same number of levels-of-detail (e.g. across 32 levels-of-detail, LOD0 to LOD31, as described herein). That said, this need not be the case, and different groups of primitives may be sorted across a different number of levels-of-detail. For example, the first group of primitives may be sorted across 32 levels-of-detail, and the second group of primitives may be sorted across 16 levels-of-detail.

In examples where this optional "grouping" step is performed, the output of step S402 may be an ordered array indicating which primitives (and/or portions of primitives, where voxelisation is used) have been allocated to each group and, for each group, which primitives (and/or portions of primitives) have been sorted to each level-of-detail. For example, the ordered array may first comprise information identifying each of the primitives allocated to the first group and sorted to the finest level-of-detail used in the first group (e.g. LOD31), followed by information identifying each of the primitives allocated to the first group and sorted to the next coarsest level-of-detail used in the first group (e.g. LOD30), and so on through to information identifying each of the primitives allocated to the first group and sorted to coarsest level-of-detail used in the first group (e.g. LOD0), followed by information identifying each of the primitives allocated to the second group and sorted to the finest level-of-detail used in the second group (e.g. LOD31), and so on. A prefix sum can be used to locate information within that array—as would be understood by the skilled person. Said array may be written to memory 314 by level-of-detail logic 308. Ordered arrays are preferably used to store this information because they can be used very efficiently by parallel processors in the subsequent processing steps. That said, in alternative examples, a linked list data structure could be used to store the same information.

Returning to FIG. 8, as described herein, steps S404 and S406 can be performed in turn at each level-of-detail. In an example, in step S404, for the finest level-of-detail, primitives of the scene (and/or portions of primitives) are assigned to threads for processing. The input to this step may be information (e.g. stored in memory 314) indicating which primitives (and/or portions of primitives) have been sorted to the finest level-of-detail. When the method returns to step S404, for the next coarsest level-of-detail, primitives (and/or portions of primitives) of the scene and nodes built in step S406 for the finest level-of-detail (e.g. collectively referred to as "elements of the scene") are assigned to threads for processing. The input to this step may be information (e.g. stored in memory 314) indicating which primitives (and/or portions of primitives) have been sorted to that level-of-detail, and information identifying nodes built in step S406 for the finest level-of-detail. Said information may be stored in the same array, or two separate arrays. In this example, the method continues to alternate between steps S404 and S406 in this way for each level-of-detail from the finest level-of-detail to the coarsest level-of-detail. In an alternative example, step S404 may first be performed for every level-of-detail so as to assign primitives (and/or portions of primitives) to threads for processing at each level-of detail. The input to this step may be information (e.g. stored in memory 314) indicating which primitives (and/or portions of primitives) have been sorted to each level-of-detail. When the method returns to step S404 after performing S406 for the finest level-of-detail, step S404 is performed so as to assign the nodes built in step S406 for the finest level-ofdetail to the threads for processing at the next coarsest level-of-detail in addition to the primitives (or portions of primitives) that were already assigned to those threads when step S404 was first performed. The input to this step may be information (e.g. stored in memory 314) indicating which primitives (and/or portions of primitives) were assigned to each thread for processing at the next-coarsest level-of-detail on the first pass of step S404, and information identifying nodes built in step S406 for the finest level-of-detail. Said information may be stored in the same array, or two separate arrays. In this alternative example, the method continues to alternate between steps S404 and S406 in this way for each level-of-detail from the finest level-of-detail to the coarsest level-of-detail. Step S404 can be understood in further detail with reference to FIGS. 9a and 9b.

Steps S802 and S804 in FIG. 8 show in further detail how step S404 can be performed. Steps S802 and S804 can be understood with reference to FIG. 9a—which shows a two-dimensional (i.e. 2D) example of assigning primitives of the scene at one level-of-detail to threads for subsequent processing. Typically a scene would be three-dimensional (i.e. 3D), but for ease of illustration and understanding FIG. 9a show a two-dimensional scene.

In FIG. 9a, a scene 900 comprising sixteen primitives 32, 33, 34, 35, 36, 37, 38, 39, 40, 41, 42, 43, 44, 45, 46 and 47 is shown. It is to be understood that a scene may comprise any number of primitives—in fact, a typical scene may comprise tens-of-thousands, or even hundreds-of-thousands, of primitives. FIG. 9a shows one level-of-detail for the scene—e.g. LOD3 where, in 2D, the scene is divided into 64 voxels. Each of primitives 32 to 47 may have been sorted to LOD3 in step S402. Primitives 32 to 47 may be referred to as elements of the scene. In FIG. 9a, for ease of illustration, each primitive is shown fitting neatly within a voxel. This need not be case, it is possible (and in fact, likely) that one or more of the primitives would overlap the voxel boundaries. In practice, at LOD3, the elements of the scene would likely include one or more nodes built in the previous iteration of step S406 for the next finest level-of-detail (e.g. LOD4). Also, where voxelisation is used, the elements of the scene may include portions of sub-divided primitives. However, these further elements of the scene have been omitted from FIG. 9a for ease of illustration.

In step S802, a different one or more blocks of memory are assigned, in a memory, to each of a plurality of threads. Each of the blocks of memory comprises one or more memory locations. The memory may be a cache or a software representation of a cache (e.g. cache 316 shown in FIG. 3). In a first example, the memory may be a direct-mapped cache, or a software representation thereof; each of the blocks of memory may be a group of one or more cachelines, or a software representation thereof; and each of the memory locations may be a cacheline, or a software representation thereof. In a second example, the memory may be a set-associative cache, or a software representation thereof; each of the blocks of memory may be a group of one or more sets of cachelines, or a software representation thereof; and each of the memory locations may be a cacheline, or a software representation thereof. In this second example, a set of cachelines may comprise a plurality of cachelines that share the same cache index. A block of memory may span a contiguous set of memory addresses—although this need not be the case. Each block of memory may be of the same size (e.g. span the same number of memory addresses)—although this need not be the case. Each block of memory may be contiguous within the memory—although this need not be the case.

FIG. 9a schematically shows a memory 316 (e.g. cache 316 shown in FIG. 3) comprising four blocks of memory 1000-0, 1000-1, 1000-2 and 1000-3, each block of memory comprising four memory locations. In the example shown in FIG. 9a: block of memory 1000-0 is assigned to Thread 0; block of memory 1000-1 is assigned to Thread 1; block of memory 1000-2 is assigned to Thread 2; and block of memory 1000-3 is assigned to Thread 3. It is to be understood that the partitioning of memory 316 into four blocks of memory for assigning to four threads as shown in FIG. 9a is shown by way of example only. In practice, the memory may be partitioned into any suitable number of blocks of memory. For example, as described herein, a workgroup may comprise 1024 threads. Hence, the memory may be partitioned into 1024 blocks of memory, with each thread being assigned one of those blocks of memory. Alternatively, it may be desirable to assign multiple blocks of memory to each thread. In this case, the memory may be partitioned into an even greater number of blocks of memory (e.g. 2048, 3072, or any other suitable number of blocks of memory).

In step S804, for each element of the plurality of elements of the scene, that element of the scene is assigned to a block of memory so as to assign that element to a thread. Step S804 may be performed such that that each element of the scene is assigned to only one block of memory and all of the elements of the scene are assigned to a block of memory. An element of the scene may be assigned to a block of memory in dependence on its position within in the scene. The centre point of each element may be used to determine its position (e.g. where an element overlaps one or more voxel boundaries, not shown in FIG. 9a)—although the position of any other point on the element could be used. Where the centre point of an element falls on a boundary between voxels, it may be deemed to be positioned in the voxel having the lowest coordinate value. For example, by this logic, where the centre point of an element falls on the horizontal (e.g. x-axis) boundary between voxels (0,0) and (0,–1), that element may be deemed to be positioned in voxel (0,–1)—although it is to be understood that the opposite logic could also be used. In another example, the coordinate position of an element of the scene can be "floored" (e.g. by discarding every digit after the decimal point or, in other words, rounded down to the nearest integer value) in order to determine which voxel that element is positioned in. For example, where the centre point of an element of the scene has coordinates (0.99, –1.00), the values of that coordinate position can be floored to give (0, –1) such that that element of the scene can be deemed to be positioned in voxel (0, –1). It is to be understood that the coordinate position could alternatively be rounded up to the nearest integer value in order to determine which voxel that element is positioned in.

FIG. 9a shows an example in which portions of the scene are associated with the assigned blocks of memory according to a regular pattern. In this example, each element of the scene is assigned to a block of memory in dependence on the portion of the scene it is positioned in. That is, in FIG. 9a: primitives 33 and 34 positioned in the "top-left" portion of the scene (shown using upward diagonal shading) are assigned in step S804 to block of memory 1000-0 so as to be assigned to Thread 0; primitives 35, 36, 39, 40, 41, 42, 43 and 46 positioned in the "top-right" portion of the scene (shown using cross-hatching) are assigned in step S804 to block of memory 1000-1 so as to be assigned to Thread 1; primitive 32 positioned in the "bottom-left" portion of the scene (shown using dot shading) is assigned in step S804 to block of memory 1000-2 so as to be assigned to Thread 2;

and primitives 37, 38, 44, 45 and 47 positioned in the "bottom-right" portion of the scene (shown using downward diagonal shading) are assigned in step S804 to block of memory 1000-3 so as to be assigned to Thread 3.

It is to be understood that any other suitable regular or repeating pattern could be used to associate portions of the scene with the assigned blocks of memory. Each portion of the scene in said regular or repeating pattern should include at least, in 2D, the four voxels corresponding to a voxel address at the next coarsest level-of-detail (or, in 3D, the eight voxels corresponding to a voxel address at the next coarsest level-of-detail). This is because, as will be described in further detail herein, the subsequent processing steps are intended to build nodes of the acceleration structure by grouping elements of the scene having the same corresponding (e.g. "parent") voxel address.

The output of step S804 may be an ordered array indicating which elements of the scene have been assigned to each thread. For example, the ordered array may first comprise information identifying each of the elements assigned to the first thread, followed by information identifying each of the elements assigned to the second thread, and so on. FIG. 9a shows an example of such an ordered array 902. A prefix sum can be used to locate information within that array—as would be understood by the skilled person. Said array may be written to memory 314 by thread assigning logic 310. Ordered arrays are preferably used to store this information because they can be used very efficiently by parallel processors in the subsequent processing steps. That said, in alternative examples, a linked list data structure could be used to store the same information.

During subsequent processing, as will be described herein, each thread may access (e.g. write to and/or read from) the one or more blocks of memory assigned to it. That is, during subsequent processing, each thread may not access (e.g. write to and/or read from) any of the blocks of memory that have been assigned to other threads. Partitioning the memory in this way is advantageous because each thread is free to perform the subsequent processing of the elements that it has been assigned, as will be described in further detail herein, without the risk that memory writes performed during the processing of that thread will collide with memory writes performed during the processing of another thread in parallel.

A preferable implementation of steps S802 and S804 is described with reference to FIG. 9b—which shows another two-dimensional (i.e. 2D) example of assigning primitives of the scene at one level-of-detail to threads for subsequent processing. Typically a scene would be three-dimensional (i.e. 3D), but for ease of illustration and understanding FIG. 9b show a two-dimensional scene.

Figure 9B:
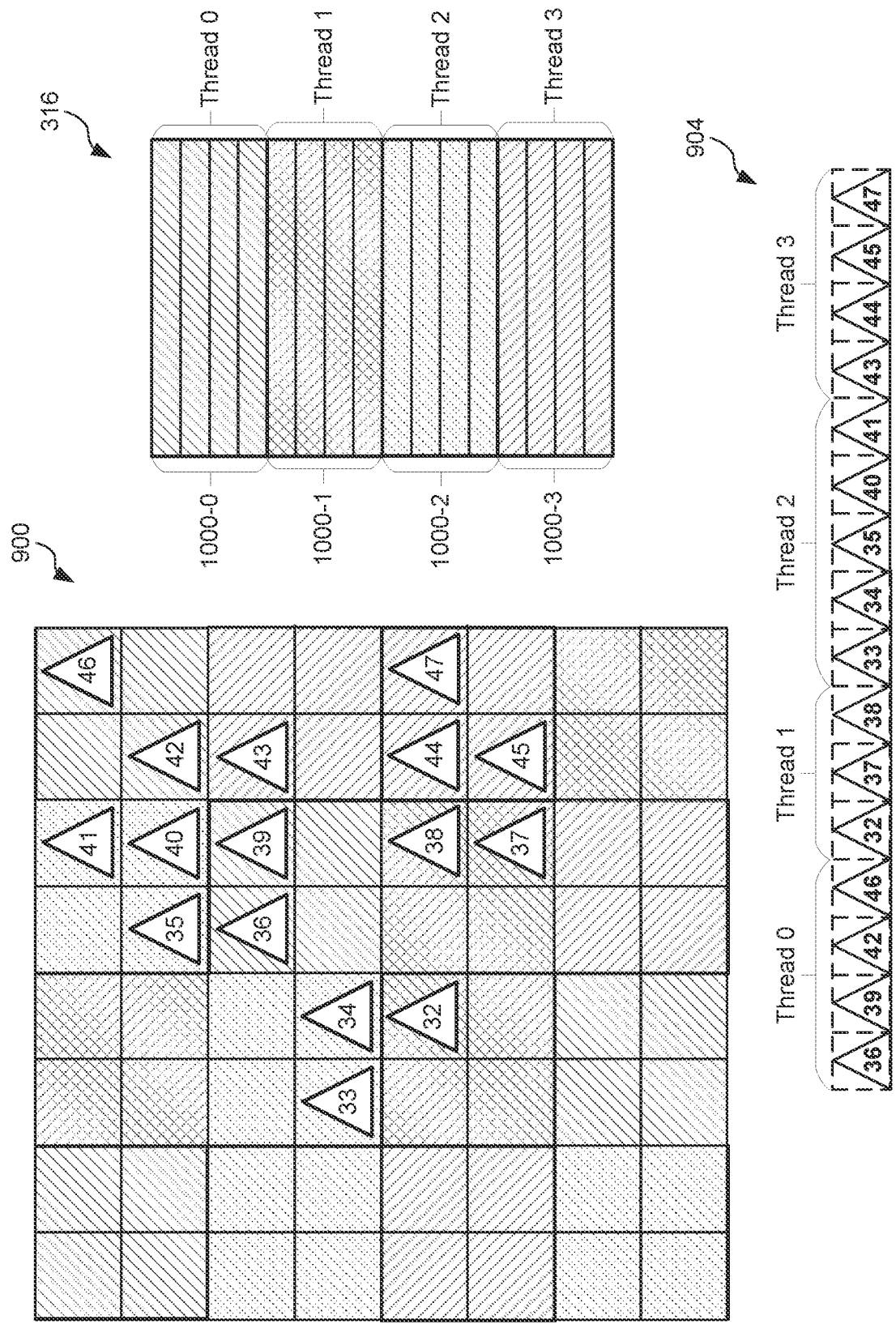

FIG. 9b shows the same scene 900, at the same level-of-detail, as has been described with reference to FIG. 9a. FIG. 9b schematically shows a memory 316 having the same properties as the memory 316 described with reference to FIG. 9a. Step S802 is performed for the scene shown in FIG. 9b in the same manner as has been described with reference to FIG. 9a. That is, in FIG. 9b: block of memory 1000-0 is assigned to Thread 0; block of memory 1000-1 is assigned to Thread 1; block of memory 1000-2 is assigned to Thread 2; and block of memory 1000-3 is assigned to Thread 3.

FIG. 9b differs from FIG. 9a in that, in this preferable implementation, a hash function is used to assign each element of the scene to a block of memory in step S804. The hash function used to assign (e.g. map) each element of the scene to a block of memory may depend on the position of that element within the scene. The position of an element within the scene may be determined by identifying which voxel at the current level-of-detail the centre point of that element is positioned in—although the position of any other point on that element could be assessed. Where the centre point of an element falls on a boundary between voxels, it may be deemed to be positioned in the voxel having the lowest coordinate value. For example, by this logic, where the centre point of an element falls on the horizontal (e.g. x-axis) boundary between voxels (0,0) and (0,−1), that element may be deemed to be positioned in voxel (0,−1)—although it is to be understood that the opposite logic could also be used. In another example, the coordinate position of an element of the scene can be "floored" (e.g. by discarding every digit after the decimal point or, in other words, rounded down to the nearest integer value) in order to determine which voxel that element is positioned in. For example, where the centre point of an element of the scene has coordinates (0.99, −1.00), the values of that coordinate position can be floored to give (0, −1) such that that element of the scene can be deemed to be positioned in voxel (0, −1). It is to be understood that the coordinate position could alternatively be rounded up to the nearest integer value in order to determine which voxel that element is positioned in. In this way, an element of the scene may be said to be associated with a voxel address at the current level-of-detail. The hash function used to assign that element of the scene to a block of memory may be dependent on the corresponding (e.g. "parent") voxel address at the next coarsest level-of-detail (e.g. as described herein with reference to FIG. 4).

By way of example only, one specific implementation of a suitable hash function is provided. The inputs to this specific example hash function are the set of coordinate values (e.g. x and y values in 2D, or x, y and z values in 3D) of the corresponding (e.g. "parent") voxel address for an element and the number of blocks of memory, M, assigned in step S802. The hash function may comprise performing a mathematical operation on the set of coordinate values so as to calculate an intermediate value. For example, in 3D, the hash function may comprise performing the following mathematical operation using the x, y and z coordinate values of the corresponding (e.g. "parent") voxel address so as to form an intermediate value: $x^3+y^3+z^3$. The hash function may further comprise performing a modulo operation so as to find the remainder were the intermediate value to be divided by the number of assigned blocks of memory, M. For example, the hash function may take the form $(x^3+y^3+z^3)$ mod(M). The output of that hash function (e.g. the remainder) may indicate the block of memory to which that element is to be assigned. For example, FIG. 9b shows four blocks of memory labelled 1000-0, 1000-1, 1000-2 and 1000-3. Were the output of the hash function for an element to be a remainder of 1, that element could be assigned to block of memory 1000-1.

It is to be understood that this specific implementation of the hash function is not intended to be limiting, as various other suitable hash functions could be designed and used. A skilled person (e.g. a software engineer) would be capable of designing, on instruction, an appropriate hash function according to the principles described herein that is suitable for assigning each element of the scene to one of a plurality of assigned blocks of memory in dependence on its corresponding (e.g. "parent") voxel address at the next coarsest level-of-detail.

In the example shown in FIG. 9b, a hash function is used in step S804 such that: primitives 36, 39, 42 and 46, positioned in portions of the scene shown using upward diagonal shading, are assigned to block of memory 1000-0 so as to be assigned to Thread 0; primitives 32, 37, and 38, positioned in portions of the scene shown using cross-hatching, are assigned to block of memory 1000-1 so as to be assigned to Thread 1; primitives 33, 34, 35, 40 and 41, positioned in portions of the scene shown using dot shading, are assigned to block of memory 1000-2 so as to be assigned to Thread 2; and primitives 43, 44, 45 and 47, positioned in portions of the scene shown using downward diagonal shading, are assigned to block of memory 1000-3 so as to be assigned to Thread 3.

Using a hash function in step S804 in this way is advantageous because it can introduce a degree of "pseudo-randomness" into the relationship between the portion of the scene in which an element is positioned and the block of memory, and thereby thread, to which that element is assigned for further processing. This is advantageous because objects are often not evenly (e.g. homogeneously) distributed across a scene. For example, often, a greater number of objects are positioned at or near the scene origin than in the peripheries of a scene. This is illustrated in FIGS. 9a and 9b, where a greater number of primitives are positioned in the "top-right" quarter of the scene than are positioned in any of the other quarters of the scene. As such, associating portions of the scene with the assigned blocks of memory according to a regular pattern, as in FIG. 9a, can lead to an uneven distribution of workload between the available threads. For example, as shown in FIG. 9a, eight primitives are assigned to Thread 1 for further processing, whilst only one primitive is assigned to Thread 2 for further processing. By contrast, as shown in FIG. 9b, using a hash function to assign elements of the scene to threads for subsequent processing can lead to a more even distribution of the workload between threads.

As described with reference to FIG. 9a, the output of step S804 may be an ordered array indicating which elements of the scene have been assigned to each thread. Said array may be written to memory 314 by thread assigning logic 310. FIG. 9b shows an example of such an ordered array 904.

The same hash function could be used at each level-of-detail. Alternatively, different hash functions could be used at different levels-of-detail. For example, the hash function used at a level-of-detail could be optimised so as to better balance the distribution of workload between threads at that level-of-detail. This may be appropriate because, as will be appreciated from FIG. 4 as described herein, the coordinate values at finer levels-of-detail may range a far greater range of values than those at coarser level-of-details. That is, in 3D, at LOD1 the sets of coordinate values may range from (0,0,0) to (−1,−1,−1) or (1,1,1), whilst at LOD31 the sets of coordinate values may range from (0,0,0) to (−2147483647, −2147483647, −2147483647) or (2147483647, 2147483647, 2147483647). As such, it may be appropriate to perform different mathematical operations on the sets of coordinate values at different levels-of-detail such that the hash function can be used to assign elements to blocks of memory across the full range of the plurality of assigned blocks of memory. In other examples, different approaches to assigning elements to threads could be used at different levels-of-detail. For example, at one or more of the coarser levels-of-detail, portions of the scene could be associated with the assigned blocks of memory according to a regular pattern, as described with reference to FIG. 9a. Whilst, at one or more finer levels-of-detail, hash functions could be used to assign elements of the scene to blocks of memory, as described with reference to FIG. 9b.

Returning to FIG. 8, in step S406, each of the threads to which elements of the scene were assigned in step S404 are processed in parallel so as to build (e.g. form) one or more nodes of the acceleration structure. The input to step S406 may be information (e.g. stored in memory 314) indicating which elements of the scene have been assigned to each thread. Step S406 can be understood in further detail with reference to FIGS. 10a and 10b.

Figure 10A:
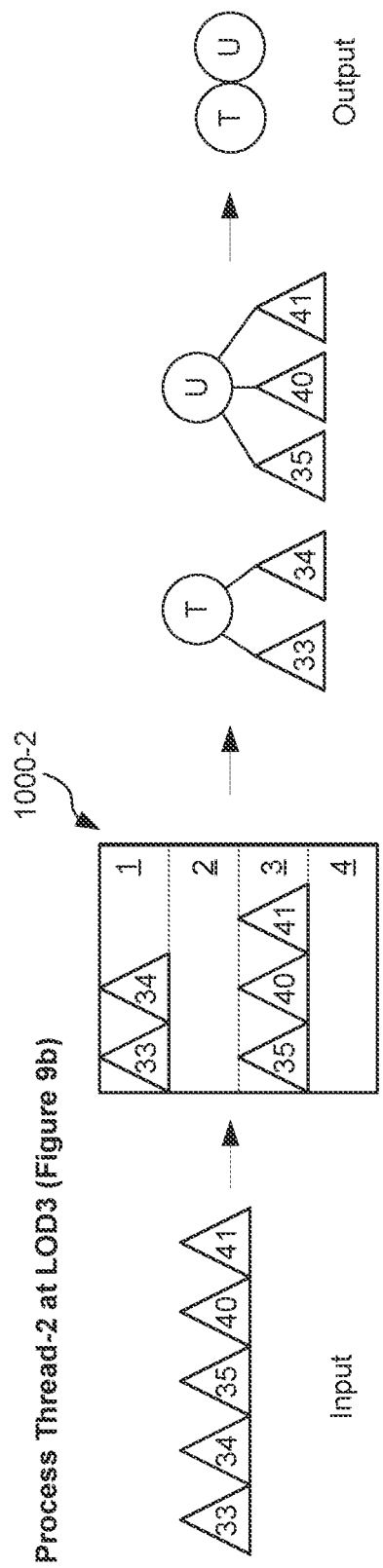
FIGS. 10a and FIG. 10b show examples of processing a thread so as to build nodes of an acceleration structure at a level-of-detail.

FIG. 10a shows an example of processing a thread so as to build nodes of an acceleration structure at a level-of-detail. In particular, FIG. 10a illustrates how primitives 33, 34, 35, 40 and 41 assigned to Thread-2 at LOD3, as described with reference to FIG. 9b, can be processed so as to form nodes of an acceleration structure. FIG. 10a is described herein with reference to steps S808 and S810 in FIG. 8, which show in further detail how step S406 can be performed.

In step S808 of FIG. 8, each element of the scene assigned to a thread is assigned to a memory location in a block of memory assigned to that thread. An element of the scene may be assigned to a memory location in a block of memory assigned to that thread in dependence on its position within in the scene. Preferably, each element of the scene can be assigned to a memory location in a block of memory assigned to that thread in dependence on a hash function. The hash function in dependence on which each element of the scene is assigned to a memory location in a block of memory assigned to that thread may depend on the position of that element within the scene. The position of an element within the scene may be determined by any of the methods for doing so described herein. In this way, an element of the scene may be said to be associated with a voxel address at the current level-of-detail. The hash function in dependence on which that element of the scene is assigned to a memory location may be dependent on the corresponding (e.g. "parent") voxel address at the next coarsest level-of-detail (e.g. as described herein with reference to FIG. 4).

By way of example only, one specific implementation of a suitable hash function is provided. The inputs to this specific example hash function are the set of coordinate values (e.g. x and y values in 2D, or x, y and z values in 3D) of the corresponding (e.g. "parent") voxel address for an element and the number of memory locations, $M_L$, in the blocks of memory assigned to the thread being processed. The hash function may comprise performing a mathematical operation on the set of coordinate values so as to calculate an intermediate value. For example, in 3D, the hash function may comprise performing the following mathematical operation using the x, y and z coordinate values of the corresponding voxel address so as to form an intermediate value: $2x^2+2y^2+2z^2$. The hash function may further comprise performing a modulo operation so as to find the remainder were the intermediate value to be divided by the number of memory locations, $M_L$. For example, the hash function may take the form $(2x^2+2y^2+2z^2)\mod(M_L)$. The memory location to which that element is to be assigned may be determined in dependence on the output of that hash function (e.g. the remainder). In examples where the memory is a direct-mapped cache, the output of that hash function may indicate the cacheline to which that element is to be assigned. In examples where the memory is a set-associative cache, the output of that hash function may indicate a set of cachelines comprising a plurality of cachelines that share the same cache index—where that element is to be assigned to one of those cachelines, as described in further detail herein.

It is to be understood that this specific implementation of the hash function is not intended to be limiting, as various other suitable hash functions could be designed and used. A skilled person (e.g. a software engineer) would be capable of designing, on instruction, an appropriate hash function according to the principles described herein that is suitable for assigning each element of the scene to a memory location in a block of memory assigned to the thread being processed in dependence on its corresponding voxel address at the next coarsest level-of-detail.

In step S808, when an element of the scene is assigned to a memory location, if that memory location already includes data relating to another element having the same corresponding (e.g. "parent") voxel address, the element is added to that memory location. In examples where the memory is a set-associative cache and that element is assigned to a cacheline in dependence on a hash function, each of the plurality of cachelines in the set of cachelines indicated by the hash function can be checked for data relating to another element having the same corresponding (e.g. "parent") voxel address. If one of the cachelines in the set already includes data relating to another element having the same corresponding (e.g. "parent") voxel address, the element can be added to that cacheline. If none of the cachelines in the set already includes data relating to another element having the same corresponding (e.g. "parent") voxel address, the element can be added to any of those cachelines that have not yet had elements assigned thereto. In an illustrative example, FIG. 10a shows memory locations 1, 2, 3 and 4 in block of memory 1000-2 assigned to Thread-2. As can be seen in FIG. 9b, primitives 33 and 34 are positioned in adjacent voxels. As described with reference to FIG. 4, the corresponding (e.g. "parent") voxel address for a voxel at a level-of-detail (e.g. LOD(N)) is the voxel address of the voxel at the next coarsest level-of-detail (e.g. LOD(N−1)) that contains the portion of the scene contained by that voxel. By this reasoning, it can be understood from FIG. 9b that both primitives 33 and 34 have the same corresponding (e.g. "parent") voxel address in the next coarsest level-of-detail. As such, according to the principles described herein, both primitives 33 and 34 are assigned to the same memory location—in the example shown in FIG. 10a, memory location 1. As can be seen in FIG. 9b, primitives 35, 40 and 41 are also positioned in a set of adjacent voxels. It can be understood from FIG. 9b that each of primitives 35, 40 and 41 have the same corresponding (e.g. "parent") voxel address in the next coarsest level-of-detail. As such, according to the principles described herein, each of primitives 35, 40 and 41 are assigned to the same memory location—in the example shown in FIG. 10a, memory location 3. That is, through step S808, elements of the scene sharing a common corresponding (e.g. "parent") voxel address (e.g. being located in a similar position in the scene) have been grouped together.

In step S810, data representing the assigned element(s) is evicted from each memory location to which one or more elements of the scene have been assigned so as to form nodes of the acceleration structure grouping elements assigned to same memory location. For example, once each of the elements allocated to the thread have been processed, the memory can be flushed (e.g. each of its memory locations can be evicted). A node for the acceleration structure can be created each time a memory location is evicted. For example, in FIG. 10a; memory location 1 in block of memory 1000-2 is evicted so as to form a node T including pointers to primitives 33 and 34; and memory location 3 in block of memory 1000-2 is evicted so as to form a node U including pointers to primitives 25, 40 and 41.

It is also to be understood that evictions may occur before all of the elements allocated to the thread have been processed. For example, in step S808, when an element of the scene is assigned to a memory location, if that memory location already includes data relating to another element having a different corresponding (e.g. "parent") voxel address, a "collision" occurs. In this case, a memory location can be evicted to make space for the assigned element of the scene. A node of the acceleration structure would also be built when this "early" eviction occurs. In an example, when a collision occurs, the memory location at which the collision occurred can be evicted. In another example, a different memory location (perhaps even in a different block of memory assigned to that thread) can be evicted—e.g. a "first-in first-out", or "least-recently-written" eviction policy could be used such that the "oldest" memory location is evicted.

For each node of the acceleration structure built, a bounding box (e.g. an axis aligned bounding box—AABB) encompassing each of the elements of the scene assigned to same memory location may be formed. For example, referring to FIG. 9b, a first bounding box would be formed for node T that encompasses both primitives 33 and 34, and a second bounding box would be formed for node U that encompasses each of primitives 35, 40 and 41. Each bounding box formed in step S810 may be stored in memory (e.g. memory 314 in FIG. 3) as an element of the scene at the next coarsest level-of-detail, to be accessed as input to step S802 when that next coarsest level-of-detail is processed. As described herein, the output of step S402 may be an ordered array indicating which primitives (and/or portions of primitives, where voxelisation is used) have been sorted to each level-of-detail. Nodes built for a level-of detail by performing step S810 may be added to that array as elements of the scene for the next coarsest level-of-detail. In an example, where the sorted array contains references to primitives at LOD(N−1) followed by references to primitives at LOD(N), then when performing step S810 for LOD(N) the generated node references can be written in place of the primitive references for LOD(N), and the range of the array that will be processed in steps S802 to S810 for LOD(N−1) can be expanded. In this example, the primitive references may be read and assigned to threads before the newly generated node references can be written over the top. In an alternative example, a separate array could be used to indicate nodes built in step S810, such that two separate arrays are input to step S802 when processing the next coarsest level-of detail.

Steps S808 and S810 can be performed, in parallel, for each of the threads to which elements of the scene were assigned in steps S802 and S804. As described herein, the method then returns to steps S802 and S804 where, for the next coarsest level-of-detail, elements of the scene are assigned to threads for further processing—according to the principles described with reference to FIGS. 9a and 9b. The method then progresses back to steps S808 and S810, where, for that next coarsest level-of-detail, nodes of the acceleration structure are built by processing each of the threads in parallel.

Figure 10B:
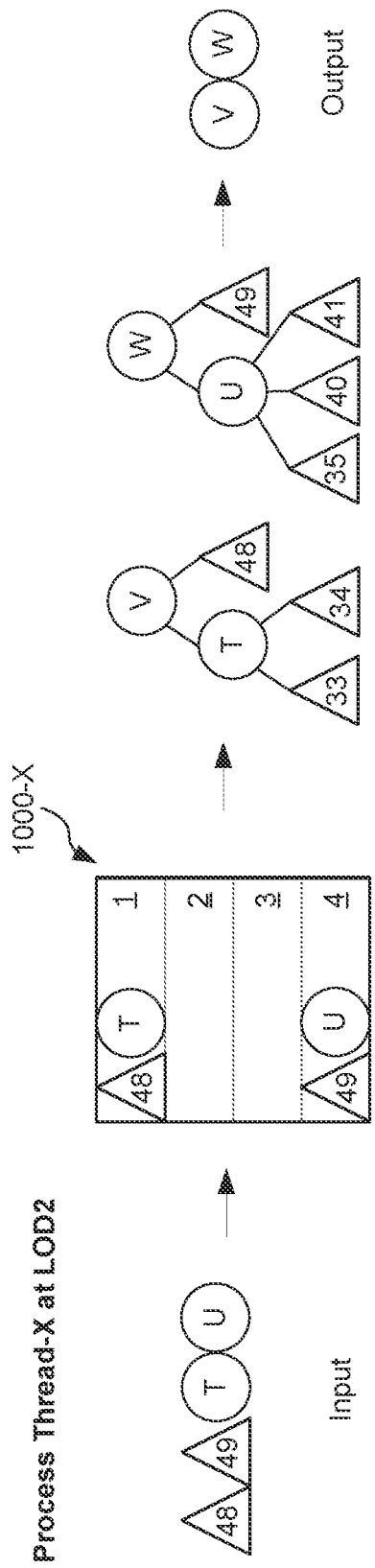

FIG. 10b shows an example of processing a thread so as to build nodes of an acceleration structure at the next coarsest level-of-detail (e.g. LOD2, where FIG. 10a showed LOD3). The input to FIG. 10b is a Thread-X to which primitives 48 and 49 (previously sorted to LOD2—not shown elsewhere in the Figures) and nodes T and U (formed for LOD3 as shown in FIG. 10a) have been assigned. The step of assigning elements of the scene to Thread-X is not shown schematically in the Figures, but it can be understood that this step could be performed according to the principles described with reference to FIGS. 9a and 9b. In this example, according to the principles described herein: primitive 48 and node T are assigned to memory location 1 in block of memory 1000-X assigned to Thread-X; and primitive 49 and node U are assigned to memory location 4 in block of memory 1000-X assigned to Thread-X. When these memory locations are evicted, two new nodes of the acceleration structure are built: node V including pointers to primitive 48 and node T; and node W including pointers to primitive 49 and node U.

Steps S404 and S406 can be performed, in turn, for each of the levels-of-detail to which primitives are sorted in step S402, starting at the finest level-of-detail (e.g. LOD31) and progressing through to the coarsest level of detail (e.g. LOD0). Once these steps have been performed for all of the levels-of-detail, the various nodes built in each iteration of step S406 form an acceleration structure for the scene—which can be stored in memory (e.g. memory 304 in FIG. 3) for subsequent use in ray tracing (e.g. by intersection testing module 108 and processing logic 110, as described herein).

It is to be understood that, in some examples, the primitive data itself indicated in the received input geometric data may be processed as described herein with reference to steps S402, S404 and S406 of FIG. 8. In alternative examples, a pre-processing step may be performed, either before step S402 or between steps S402 and S404, so as to form a bounding box (e.g. an axis aligned bounding box—AABB) for each of the primitives of the scene indicated in the received input geometric data. The steps of the method following that pre-processing step would then process those bounding boxes, representative of the primitives, as elements of the scene in the same way as the primitives themselves can be processed as described herein with reference to steps S402, S404 and S406 of FIG. 8. Each of those bounding boxes would become leaf nodes in the acceleration structure, each of those leaf nodes including a pointer to the respective primitive data for the primitive for which that bounding box was formed. Put another way, it is to be understood that any use of the term "primitive" herein could be read as a reference to a primitive itself, or to a bounding box (e.g. AABB) formed for that primitive. It is also to be understood that any primitive shown as a triangle in FIG. 7, 9*a*, 9*b*, 10*a* or 10*b* could alternatively be shown as a bounding box (e.g. AABB) formed for that primitive.

Figure 11:
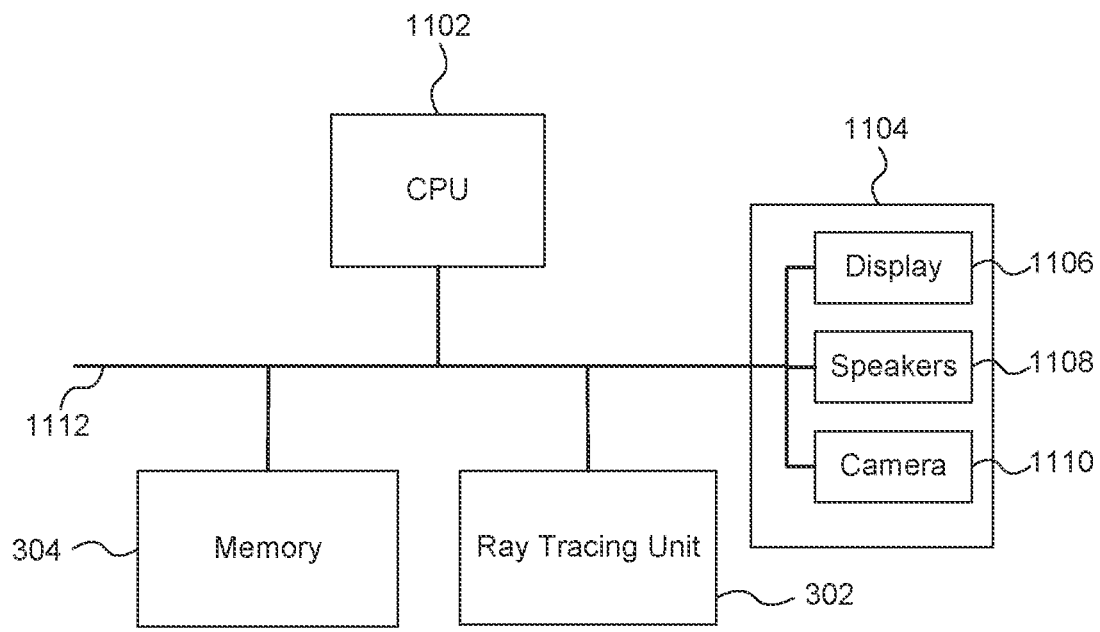
FIG. 11 shows a computer system in which a ray tracing unit is implemented.

FIG. 11 shows a computer system in which the ray tracing system described herein may be implemented. The computer system comprises a CPU 1102, memory 304, ray tracing unit 302 and other devices 1104, such as a display 1106, speakers 1108 and a camera 1110. The components of the computer system can communicate with each other via a communications bus 1112.

The ray tracing system 300 of FIG. 3 is shown as comprising a number of functional blocks. This is schematic only and is not intended to define a strict division between different logic elements of such entities. Each functional block may be provided in any suitable manner. It is to be understood that intermediate values described herein as being formed by a ray tracing system need not be physically generated by the ray tracing system at any point and may merely represent logical values which conveniently describe the processing performed by the ray tracing system between its input and output.

The ray tracing systems described herein may be embodied in hardware on an integrated circuit. The ray tracing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a ray tracing system configured to perform any of the methods described herein, or to manufacture a ray tracing system comprising any apparatus described herein. An integrated circuit definition dataset may be, for example, an integrated circuit description.

Therefore, there may be provided a method of manufacturing, at an integrated circuit manufacturing system, a ray tracing system as described herein. Furthermore, there may be provided an integrated circuit definition dataset that, when processed in an integrated circuit manufacturing system, causes the method of manufacturing a ray tracing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a ray tracing system will now be described with respect to FIG. 12.

Figure 12:
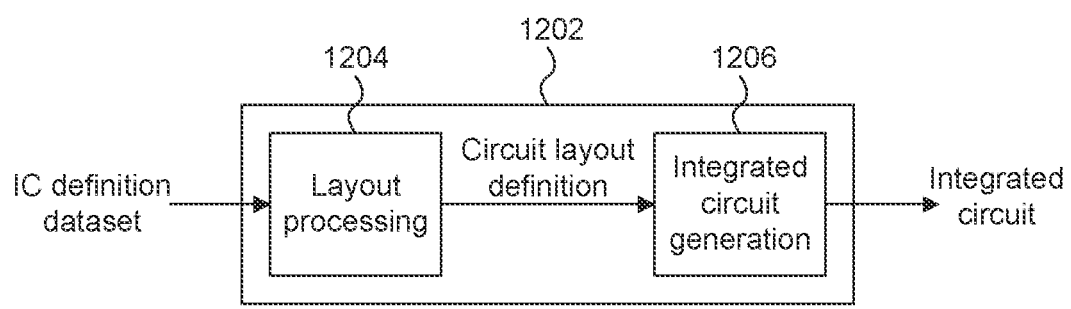
FIG. 12 shows an integrated circuit manufacturing system for generating an integrated circuit embodying a ray tracing system as described herein.

FIG. 12 shows an example of an integrated circuit (IC) manufacturing system 1202 which is configured to manufacture a ray tracing system as described in any of the examples herein. In particular, the IC manufacturing system 1202 comprises a layout processing system 1204 and an integrated circuit generation system 1206. The IC manufacturing system 1202 is configured to receive an IC definition dataset (e.g. defining a ray tracing system as described in any of the examples herein), process the IC definition dataset, and generate an IC according to the IC definition dataset (e.g. which embodies a ray tracing system as described in any of the examples herein). The processing of the IC definition dataset configures the IC manufacturing system 1202 to manufacture an integrated circuit embodying a ray tracing system as described in any of the examples herein.

The layout processing system 1204 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1204 has determined the circuit layout it may output a circuit layout definition to the IC generation system 1206. A circuit layout definition may be, for example, a circuit layout description.

The IC generation system 1206 generates an IC according to the circuit layout definition, as is known in the art. For example, the IC generation system 1206 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1206 may be in the form of computer-readable code which the IC generation system 1206 can use to form a suitable mask for use in generating an IC.

The different processes performed by the IC manufacturing system 1202 may be implemented all in one location, e.g. by one party. Alternatively, the IC manufacturing system 1202 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a ray tracing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 6 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 6, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A ray tracing system for building an acceleration structure for use in ray tracing, the ray tracing system comprising thread assigning logic, node building logic, and a memory;
    the thread assigning logic being configured to:
        assign, in the memory, a different one or more blocks of memory to each of a plurality of threads, each of the blocks of memory comprising one or more memory locations, and
        for each element of a plurality of elements of a scene for which nodes of the acceleration structure are to be built, assign that element of the scene to a block of memory so as to assign that element to a thread; and
    the node building logic being configured to:
        build one or more nodes of the acceleration structure by processing each of the plurality of threads in parallel.

2. A non-transitory computer readable storage medium having stored thereon computer readable instructions that, when executed at a computer system, cause the computer system to perform a method of building an acceleration structure for use in ray tracing, the method comprising:
    (i) assigning, in a memory, a different one or more blocks of memory to each of a plurality of threads, each of the blocks of memory comprising one or more memory locations;
    (ii) for each element of a plurality of elements of a scene for which nodes of the acceleration structure are to be built, assigning that element of the scene to a block of memory so as to assign that element to a thread; and
    (iii) building one or more nodes of the acceleration structure by processing each of the plurality of threads in parallel.

3. A computer implemented method of building an acceleration structure for use in ray tracing, the method comprising:
    (i) assigning, in a memory, a different one or more blocks of memory to each of a plurality of threads, each of the blocks of memory comprising one or more memory locations;
    (ii) for each element of a plurality of elements of a scene for which nodes of the acceleration structure are to be built, assigning that element of the scene to a block of memory so as to assign that element to a thread; and
    (iii) building one or more nodes of the acceleration structure by processing each of the plurality of threads in parallel.

4. The computer implemented method of claim 3, wherein elements of the scene are distributed across a number of levels-of-detail, each level-of-detail dividing the scene into one or more voxels, wherein finer levels-of-detail represent the scene using a greater number of smaller voxels and coarser levels-of-detail represent the scene using a smaller number of larger voxels.

5. The computer implemented method of claim 4, wherein the scene is a three-dimensional scene, and a voxel is a volume containing a portion of the scene.

6. The computer implemented method of claim 4, wherein each voxel has a voxel address, each voxel address comprising a set of coordinates and data identifying the level-of-detail at which that voxel is present.

7. The computer implemented method of claim 6, wherein the set of coordinates are defined relative to a scene origin.

8. The computer implemented method of claim 4, the method further comprising, for each of a plurality of levels-of-detail in turn, starting at a finer level-of-detail, performing said steps (i), (ii) and (iii).

9. The computer implemented method of claim 3, the method further comprising using a hash function to assign that element of the scene to the block of memory.

10. The computer implemented method of claim 9, wherein elements of the scene are distributed across a number of levels-of-detail, each level-of-detail dividing the scene into one or more voxels, wherein finer levels-of-detail represent the scene using a greater number of smaller voxels and coarser levels-of-detail represent the scene using a smaller number of larger voxels, and wherein that element of the scene is associated with a voxel address at a current level-of-detail, and the hash function used to assign that element to the block of memory is dependent on a corresponding voxel address at a coarser level-of-detail.

11. The computer implemented method of claim 10, wherein the corresponding voxel address at the coarser level-of-detail is determined by:
    dividing, by two, each coordinate of the voxel address associated with that element at the current level-of-detail; and
    rounding each divided coordinate value down to the nearest integer coordinate value.

12. The computer implemented method of claim 3, wherein building one or more nodes of the acceleration structure comprises, for each thread of the plurality of threads:
    for each element of the elements of the scene assigned to that thread, assigning that element to a memory location in a block of memory; and
    evicting data representing the assigned element(s) from each memory location to which one or more elements of the scene have been assigned so as to form nodes of the acceleration structure grouping elements assigned to same memory location.

13. The computer implemented method of claim 12, further comprising defining a bounding box for each node of the acceleration structure encompassing each of the elements of the scene assigned to same memory location.

14. The computer implemented method of claim 12, the method further comprising assigning that element of the scene to the memory location in the block of memory in dependence on a hash function.

15. The computer implemented method of claim 14, wherein elements of the scene are distributed across a number of levels-of-detail, each level-of-detail dividing the scene into one or more voxels, wherein finer levels-of-detail represent the scene using a greater number of smaller voxels and coarser levels-of-detail represent the scene using a smaller number of larger voxels, and wherein that element of the scene is associated with a voxel address at a current level-of-detail, and the hash function in dependence on which that element is assigned to the memory location in the block of memory is dependent on a corresponding voxel address at a coarser level-of-detail.

16. The computer implemented method of claim 3, wherein an element of the scene is a primitive, a portion of a sub-divided primitive or a node of the acceleration structure built for a finer level-of-detail.

17. The computer implemented method of claim 3, wherein the memory is a cache or a software-representation of a cache.

18. The computer implemented method of claim 17, wherein:
  the memory is a set-associative cache, each of the blocks of memory is a group of one or more sets of cachelines, and each of the memory locations is a cacheline; or
  the memory is a direct-mapped cache, each of the blocks of memory is a group of one or more cachelines, and each of the memory locations is a cacheline; or
  the memory is a software-representation of a set-associative cache, each of the blocks of memory is a software-representation of a group of one or more sets of cachelines, and each of the memory locations is a software-representation of a cacheline; or
  the memory is a software-representation of a direct-mapped cache, each of the blocks of memory is a software-representation of a group of one or more cachelines, and each of the memory locations is a software-representation of a cacheline.

19. The computer implemented method of claim 3, wherein the scene comprises a plurality of primitives, and the method further comprises, prior to said steps (i), (ii), and (iii):
  sorting the primitives into multiple groups of primitives, such that each primitive of the scene is allocated to only one group and all of the primitives are allocated to a group; and
  for each group of primitives, independently performing said steps (i), (ii) and (iii).

20. The computer implemented method of claim 19, the method further comprising sorting the primitives into multiple groups of primitives in dependence on the position of each of the primitives within in the scene.

* * * * *